US011886145B2

(12) United States Patent
Itami

(10) Patent No.: US 11,886,145 B2
(45) Date of Patent: Jan. 30, 2024

(54) ELECTROSTATIC CHARGE IMAGE DEVELOPING TONER AND MANUFACTURING METHOD OF SAME, IMAGE FORMING METHOD, IMAGE FORMING SYSTEM AND OUTPUT PRODUCT USING SAME

(71) Applicant: Konica Minolta, Inc., Tokyo (JP)

(72) Inventor: Akihiko Itami, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 23 days.

(21) Appl. No.: 17/807,985

(22) Filed: Jun. 21, 2022

(65) Prior Publication Data

US 2023/0039387 A1 Feb. 9, 2023

(30) Foreign Application Priority Data

Jul. 9, 2021 (JP) ................................ 2021-114308

(51) Int. Cl.

*G03G 9/097* (2006.01)
*G03G 15/08* (2006.01)
*G03G 9/087* (2006.01)

(52) U.S. Cl.

CPC ..... *G03G 9/09783* (2013.01); *G03G 9/08711* (2013.01); *G03G 15/08* (2013.01)

(58) Field of Classification Search

CPC .................................................... G03G 9/0918

See application file for complete search history.

(56) References Cited

FOREIGN PATENT DOCUMENTS

| | | | |
|---|---|---|---|
| CN | 103365133 | * 10/2013 | G03G 9/08 |
| JP | 2001-301225 | * 10/2001 | G03G 15/05 |
| JP | 2020-514523 A | 5/2020 | |

OTHER PUBLICATIONS

Translation of CN 103365133.*
Translation of JP 2001-301225.*

* cited by examiner

*Primary Examiner* — Peter L Vajda
(74) *Attorney, Agent, or Firm* — LUCAS & MERCANTI, LLP

(57) ABSTRACT

Provided is an electrostatic charge image developing toner including toner matrix particles containing at least a binder resin, wherein a photosensitizer having a singlet oxygen generating ability is contained inside the toner matrix particles or in an external additive attached to the toner matrix particles.

13 Claims, 3 Drawing Sheets

ELECTROSTATIC CHARGE IMAGE DEVELOPING TONER AND MANUFACTURING METHOD OF SAME, IMAGE FORMING METHOD, IMAGE FORMING SYSTEM AND OUTPUT PRODUCT USING SAME

CROSS-REFERENCE TO RELATED APPLICATIONS

The entire disclosure of Japanese Patent Application No. 2021-114308 filed on Jul. 9, 2021 is incorporated herein by reference in its entirety.

BACKGROUND

Technological Field

The present invention relates to an electrostatic charge image developing toner and its manufacturing method, as well as an image forming method, an image forming system, and an output product using the same. More specifically, the present invention relates to an electrostatic charge image developing toner that can exert antibacterial and antiviral effects even on non-image areas in digital printing, and a method for manufacturing the same.

Description of the Related Art

With the recent spread of infectious diseases, there is a growing demand for printed materials with antibacterial and antiviral effects in the commercial and industrial printing fields. Under these circumstances, various antibacterial and antiviral printing methods are being used to provide antibacterial functions, such as applying varnish containing antibacterial agents to the surface of printed materials or laminating films with antibacterial functions. For example, Patent Document 1 (JP-A 2020-514523) discloses an aqueous varnish containing a phenalene compound, a sensitizer with a singlet oxygen generating ability, and by utilizing the antibacterial and antiviral effects of singlet oxygen, it is said that it can exhibit antibacterial and antiviral effects even in indoor light and low humidity environment.

However, in the above methods, the process becomes complicated because a protective layer with antibacterial and antiviral functions is added on the printed surface after the printing process, and the adhesion between the printed surface and the varnish or laminate used to form the protective layer becomes poor. There is a problem that the texture of the printing substrate itself is lost.

In response to the above problem, an attempt is also being made to perform antibacterial-antiviral printing that does not require complicated processes by imparting an antibacterial-antiviral function to a toner instead of varnish or laminate. However, in the toner, it has not been possible to impart an antibacterial-antiviral function to non-image areas other than image areas during printing, leaving room for improvement.

SUMMARY

The present invention was made in view of the above problems and circumstances, and an abject of the present invention is to provide an electrostatic charge image developing toner that can exert antibacterial and antiviral effects even on non-image areas in digital printing, a method for manufacturing the same, and an image forming method, image forming system, and output products using the same.

In order to solve the above problem, the inventor investigated the cause of the above problem, and found that the above problem can be solved by including a photosensitizer having a singlet oxygen generation ability inside the toner matrix (base) particles or in an external additive attached to the toner matrix particles, and thus arrived at the present invention. That is, the above issues related to the present invention are solved by the following means.

To achieve at least one of the above-mentioned objects of the present invention, an electrostatic charge image developing toner that reflects an aspect of the present invention is as follows.

An electrostatic charge image developing toner comprising toner matrix particles containing at least a binder resin, wherein a photosensitizer having a singlet oxygen generating ability is contained inside the toner matrix particles or in an external additive attached to the toner matrix particles.

The above means of the present invention enables to provide an electrostatic charge image developing toner and its manufacturing method that can exert antibacterial and antiviral effects even on non-image areas in digital printing, as well as an image forming method, image forming system, and output products using the same. The expression mechanism or action mechanism of the effect of the present invention is not clear, but is inferred as follows.

The electrostatic charge image developing toner of the present invention is an electrostatic charge image developing toner comprising toner matrix particles containing at least a binding resin, characterized in that a photosensitizer having a singlet oxygen generating ability is contained inside the toner matrix particles or in an external additive attached to the toner matrix particles.

On the other hand, varnishes and laminates containing antibacterial and antiviral agents (Ag, Cu, and Zn) are used to form images of printed matter having general antibacterial and antiviral effects, but since the antibacterial and antiviral agents (Ag, Cu, and Zn) are not a gas, the antibacterial and antiviral effects will not diffuse to the non-image area other than the image area at the time of printing.

In contrast to the above varnish, the electrostatic charge image developing toner of the present invention contains a photosensitizer having a singlet oxygen generating ability, which generates singlet oxygen upon irradiation with room light. Since singlet oxygen is a gas, it diffuses to the non-image areas as well as the image areas during printing, resulting in antibacterial and antiviral effects.

Although the photosensitizers with a singlet oxygen generation ability contained in the toner are not particularly limited, it is considered preferable for them to exist in a monomolecular state rather than in an aggregated state to effectively transfer energy to oxygen. On the other hand, depending on the structural and physicochemical properties of the photosensitizer, the stability of the photosensitizer may be reduced in the monomolecular state, so it is more desirable to take into account the need to create a structure that may stabilize the photosensitizer. In the present invention, it is presumed that the problem may be solved by considering the action mechanism and the stability of the photosensitizer as described above. Details of the action mechanism will be described later as appropriate.

The fact that singlet oxygen generated by photosensitizers has antibacterial and antiviral effects has been demonstrated by a technology developed by a research institute of the University of Regensburg (Germany), and TriOptoTec GmbH and a water-based varnish “Lock 3” based on the technology and commercialized by Varcotec GmbH (Germany) (see "https://www.sinsei-corp.co.jp/information/lock3.html).

BRIEF DESCRIPTION OF THE DRAWINGS

The advantages and features provided by one or more embodiments of the invention will become more fully understood from the detailed description given hereinbelow and the appended drawing which are given by way of illustration only, and thus are not intended as a definition of the limits of the present invention.

DETAILED DESCRIPTION OF THE EMBODIMENTS

Figure 1:
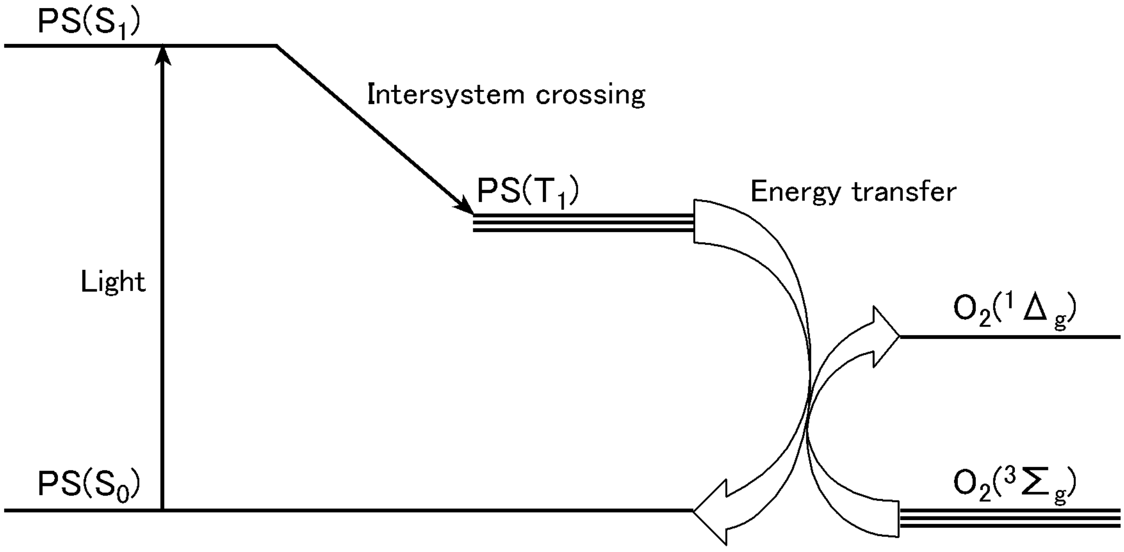
FIG. 1 is a schematic diagram showing an energy transfer between a photosensitizer in a monomolecular state and oxygen.

Hereinafter, one or more embodiments of the present invention will be described. However, the scope of the invention is not limited to the disclosed embodiments. The electrostatic charge image developing toner of the present invention is an electrostatic charge image developing toner comprising toner matrix particles containing at least a binding resin, wherein a photosensitizer having a singlet oxygen generating ability is contained inside the toner matrix particles or in an external additive attached to the toner matrix particles. This feature is a technical feature common to or corresponding to each of the following forms (embodiments).

As an embodiment of the present invention, it is preferable that the photosensitizer is dispersed in the binder resin in a monomolecular state from the viewpoint of energy transfer to oxygen.

Further, in the measurement of the emission spectrum of the photosensitizer, when monochromatic light corresponding to the absorption maximum wavelength of the absorption spectrum of the solution of the photosensitizer is irradiated, it is preferable to observe phosphorescence having a maximum emission wavelength attributed to singlet oxygen in the range of 1,270±20 nm from the viewpoint of confirming the ability to generate singlet oxygen.

As an indicator of the singlet oxygen generating ability, it is preferable to exhibit coloring derived from the monomolecular absorption spectrum of the photosensitizer from the viewpoint of confirming the singlet oxygen generating ability.

It is preferred that the photosensitizer is a phthalocyanine dye or an analog thereof, from the viewpoint of a singlet oxygen generation ability and thermal stability.

It is preferred that the photosensitizer has a structure represented by Formula (1) from the viewpoint of preventing aggregation and achieving a monomolecular state by suppressing the π-π stacking interaction in the conjugate plane of the photosensitizer molecules.

Formula (1)

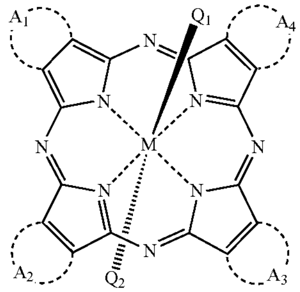

In the above Formula (1), M represents a metal atom of Group 14. $Q_1$ and $Q_2$ each independently represent a monovalent axial ligand. The above Formula (1) may not have either one of $Q_1$ and $Q_2$. $A_1$ to $A_4$ each independently represent a group of atoms that forms an aromatic ring that may have a substituent.

It is preferred from the viewpoint of expressing the effect of the present invention that the toner matrix particles contain metal oxide particles loaded with the photosensitizer.

It is preferred from the viewpoint of expressing the effect of the present invention that the metal oxide particles contain a compound having a structure represented by Formula (2) itself, or a reactant of the compound represented by Formula (2) formed by reacting with an atom or a functional group contained in the metal oxide particles to form a bond.

$$PS\text{—}(OH)_n \qquad \text{Formula (2):}$$

In Formula (2), PS represents a photosensitizer having a singlet oxygen generating ability. n is an integer.

It is preferred from the viewpoint of thermal stability that PS in the above Formula (2) represents the above phthalocyanine dye or an analog thereof.

The method for producing the electrostatic charge image developing toner of the present invention is a method for producing an electrostatic charge image developing toner, and is characterized in containing the step of dispersing the photosensitizer in a monomolecular state.

The image forming method of the present invention is an image forming method using the above-mentioned electrostatic charge image developing toner, and is characterized in that dots are formed independently of the image area. This makes it possible to exert antibacterial and antiviral effects. Further, it is preferable that the diameter of the dots is 60 μm or less because the effect may be exhibited even if the isolated dots are printed with a size that cannot be visually recognized.

The image forming system of the present invention is an image forming system including a photoreceptor charging device, a latent image forming device, a developing device, a transfer device, and a cleaning device. It is a system characterized by using the above electrostatic charge image developing toner. As a result, antibacterial and antiviral effects may be exhibited even in non-image areas.

The output products of the present invention are output products formed using the electrostatic charge image developing toner, and are characterized by being formed using the above electrostatic charge image developing toner. As a results, antibacterial and antiviral effects may be exhibited.

Hereinafter, the present invention, its constituent elements, and modes and embodiments for carrying out the present invention will be described in detail. In addition, in this application, "to" is used in the sense that the numerical values described before and after "to" are included as the lower limit value and the upper limit value.

1. Electrostatic Charge Image Developing Toner

The electrostatic charge image developing toner of the present invention (hereinafter, also simply referred to as a "toner") is an electrostatic charge image developing toner comprising toner matrix particles containing at least a binder resin. It is characterized in that a photosensitizer having a singlet oxygen generating ability is contained inside the toner matrix particles or in an external additive attached to the toner matrix particles.

(1.1) Toner Matrix Particles

The electrostatic charge image developing toner of the present invention (hereinafter also referred to as a "toner") includes toner particles containing toner matrix particles and an external additive disposed on the surface of the toner matrix particles. In this specification, "toner matrix particles" are those that constitute the matrix (base) of "toner particles. The "toner matrix particles" according to the present invention contain at least a binding resin, and may also contain other components such as a colorant, a mold release agent (wax), and a charge control agent, as needed. The "toner matrix particles" are referred to as "toner particles" by the addition of an external additive. And a "toner" refers to an aggregate of toner particles. In the present invention, a photosensitizer having a singlet oxygen generating ability is contained inside the toner matrix particles or in an external additive attached to the toner matrix particles.

(1.2) Photosensitizer

The "photosensitizer" according to the present invention is a photosensitizer that is a sensitizer for oxygen and has a singlet oxygen generating ability. Although it is not limited to a specific structure, it is a sensitizer having at least the following functions.

That is, the electrons in the photosensitizer molecule in the ground singlet ($S_0$) state are excited to a higher energy state by light absorption, and the excited singlet ($S_1$) state is obtained. Since the excited singlet ($S_1$) state is unstable, intersystem crossing occurs and shifts to the excited triplet ($T_1$) state. As described above, the photosensitizer molecule in the excited triplet ($T_1$) state is at an energy level equivalent to the energy required to perform intersystem crossing of oxygen molecules. Thereby, energy transfer occurs with the oxygen ($^3O_2$) in the triplet ($^3\Sigma_g$) state, and oxygen ($^1O_2$) in the singlet ($^1\Delta_g$) state is generated (see FIG. 1).

(Monomolecular State)

In terms of the efficiency of energy transfer from the photosensitizer to oxygen as described above, it is preferable for the photosensitizer to be in a monomolecular state to prevent interactions between photosensitizer molecules, such as energy transfer and energy deactivation (quenching) between photosensitizer molecules. In order to apply the above photosensitizers in a monomolecular state to electrostatic charge image developing toner, the photosensitizer must be dispersed (dissolved) in the toner in a monomolecular state or immobilized on the particle surface in a monomolecular state.

Of the above, it is preferable that the photosensitizer is dispersed (dissolved) in the toner in a monomolecular state. Dispersion in the binder resin in a monomolecular state is preferable from the viewpoint of effectively transferring energy from the photosensitizer to oxygen and enhancing the ability to generate singlet oxygen.

On the other hand, when the photosensitizer molecules take an aggregated state, the above-mentioned unstable excited singlet ($S_1$) state is stabilized by the intermolecular interaction, which makes intersystem crossing less likely to occur. It is difficult to shift to the excited triplet ($T_1$) state, energy transfer is suppressed with oxygen ($^3O_2$) in the triplet ($^3\Sigma_g$) state, and it is difficult to generate oxygen ($^1O_2$) in the singlet ($^1\Delta_g$) state.

On the other hand, since the monomolecular state is less stable than the aggregated state, a photosensitizer having a chemically stable structure is more desirable. For example, it is preferable from the viewpoint of thermal stability that the photosensitizer is a phthalocyanine dye or an analog thereof. The above phthalocyanine dyes or their analogues are widely used in cyan toners as colorants in pigment (aggregate) form. In particular, the electrostatic charge image developing toner in which the above phthalocyanine dyes or their analogues are contained in a monomolecular state may be used suitably for electrophotographic processes involving thermal fixation.

Whether the photosensitizer is in a monomolecular state may be confirmed by the presence or absence of an absorption peak in the solution and the coloration derived from the monomolecular absorption spectrum.

(Method of Confirming the Monomolecular State)

[Measurement of Absorption Spectrum]

The existence of the photosensitizer contained in the electrostatic charge image developing toner of the present invention in a monomolecular state may be confirmed by the presence or absence of an absorption peak of the photosensitizer in the measurement of the absorption spectrum of the solution.

For example, when a phthalocyanine dye is used as a photosensitizer, if the phthalocyanine dye is in a monomolecular state, the absorption spectrum of the solution dissolved in a solvent shows a sharp absorption peak in the vicinity of 680 nm. In addition, in the absorption spectrum of a solid, the presence or absence of a monomolecular state may be confirmed by whether or not it shows a sharp absorption peak in the vicinity of 680 nm, as described above.

However, since the electrostatic charge image developing toner usually contain a colorant in addition to the photosensitizer, there are cases where the absorption peak of the photosensitizer is hidden by the spectrum of the colorant and cannot be detected, or where the spectrum of the colorant is unintentionally mixed in and the absorption peak of the photosensitizer and the spectrum of the colorant cannot be discriminated. In such cases, a solid sample (in this case, an electrostatic charge image developing toner) is irradiated with monochromatic light of the monomolecular absorption maximum wavelength of the photosensitizer and the singlet oxygen emission spectrum may be observed to determine whether the photosensitizer in the monomolecular state is significantly present.

When determining whether or not the phthalocyanine dye in the monomolecular state is significantly present in the solid sample, when the solid sample is irradiated with monochromatic light of 680 nm, and when the phthalocyanine dye is present in the monomolecular state, a phosphorescent peak derived from singlet oxygen may be observed near 1,270 nm with a fluorometer.

From the above, in the emission spectrum measurement of the photosensitizer, when the solid sample is irradiated with monochromatic light corresponding to the absorption maximum wavelength of the absorption spectrum of the solution of the photosensitizer, if phosphorescence with an emission maximum wavelength attributed to singlet oxygen is observed in the range of 1,270±20 nm, the photosensitizer in the monomolecular state is significantly present in the solid sample.

Therefore, as described above, when the photosensitizer is in a monomolecular state, intersystem crossing is likely to occur. Since it is possible to confirm that the energy transfer from the photosensitizer to oxygen is effectively performed, it is possible to confirm that the singlet oxygen generation ability is enhanced.

Figure 2A:
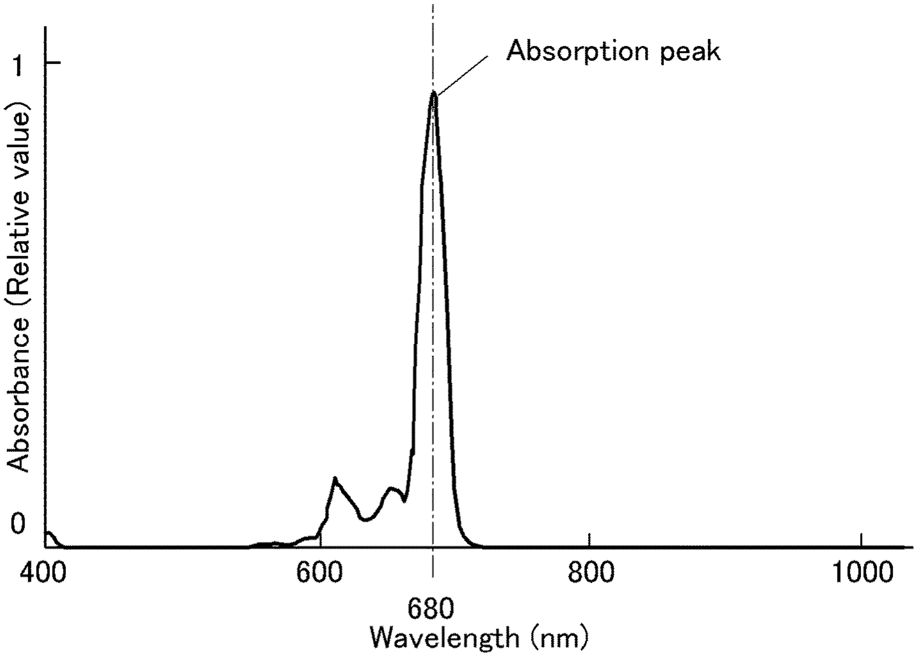
FIGS. 2A and B are diagrams showing an absorption peak in spectroscopic measurement.
Figure 2B:
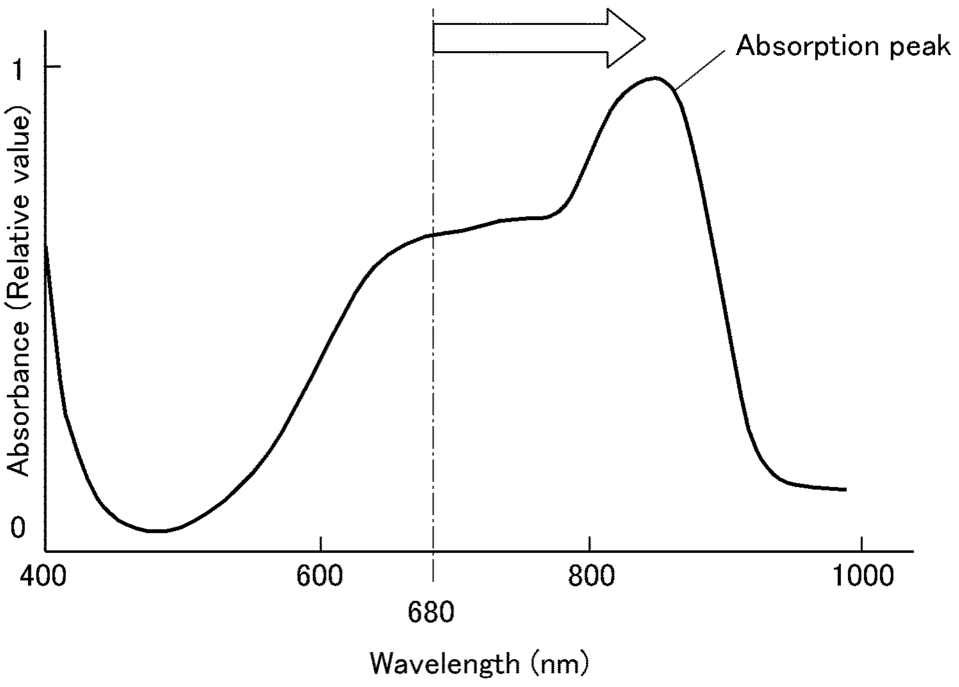

The above-mentioned principle will be described below using a phthalocyanine dye as a photosensitizer. The absorption spectra of phthalocyanine dyes in solution and solid state in the monomolecular state show a sharp absorption peak near 680 nm (see FIG. 2A). However, when the phthalocyanine dye becomes aggregated, the absorption waveform becomes broad due to intermolecular interactions, and the absorption peak shifts to the long wave or short wave side depending on the orientation of the molecules (FIG. 2B shows the shift to the long wave side). This confirms that the dye is no longer in a monomolecular state.

[Fading or Discoloration]

For example, a clear toner containing phthalocyanine dye as a photosensitizer will have a blue color if the phthalocyanine dye is present in the toner in a monomolecular state, and in this state, the increased singlet oxygen generating ability is visible. However, a clear toner that is no longer in a monomolecular state due to degradation of the phthalocyanine dye over time or other factors will lose or change its blue color, and this property may be used as an indicator of the effectiveness of the antibacterial action.

In the present invention, a "clear toner" refers to an aggregate of clear toner particles and includes, for example, a toner that does not contain coloring agents (e.g., colored pigments, colored dyes, black carbon particles, and black magnetic powder) that exhibit coloring by the action of light absorption or light scattering, such as colored pigments and colored dyes in minute amounts. It may be a toner that contains or has slightly lower transparency due to the type and amount of additives such as a resin, a mold release agent, and other internal and external additives.

(Structure of Photosensitizer)

The photosensitizers (compounds used as a photosensitizer) used in the present invention may adopt various structures as described below, and are not limited to a specific structure. In the present invention, it is particularly preferred that the photosensitizer has a structure represented by the following Formula (1) from the viewpoint of preventing aggregation and making it a monomolecular state by suppressing the π-π stacking interaction in the conjugate plane of the photosensitizer molecules.

The term "π-π stacking interaction" refers to an action caused by the dispersive force between aromatic rings and six-membered carbon rings, which have a planar structure and are rich in delocalized electrons due to the π-electron system. It refers to the action of arranging and stabilizing an aromatic ring and a carbon 6-membered ring so as to stack coins.

Formula (1)

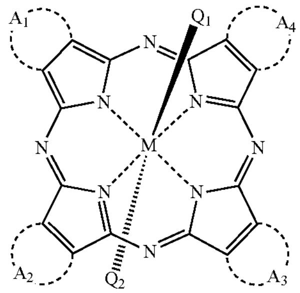

In the above Formula (1), M represents a metal atom of Group 14. $Q_1$ and $Q_2$ each independently represent a monovalent axial ligand. The above Formula (1) may not have either one of $Q_1$ and $Q_2$. $A_1$ to $A_4$ each independently represent a group of atoms that forms an aromatic ring that may have a substituent.

In general, aggregated photosensitizers have extremely low solubility in solvents and resin monomers due to strong intermolecular interactions. Therefore, as shown in the above Formula (1), by forming a molecular structure capable of introducing a soluble group onto the aromatic ring ($A_1$ to $A_4$) or the axial ligand of the metal (($Q_1$ and/or $Q_2$)), it is possible to improve solubility of the photosensitizer.

In particular, the introduction of a soluble group on the axial ligand (($Q_1$ and/or $Q_2$)) of the central metal M is more effective in suppressing the π-π stacking interaction of the conjugated planes of the photosensitizer molecule due to steric hindrance, and it is suitable. As for the central metal M, a Group 14 metal atom capable of having a plurality of axial ligands in the vertical direction of the conjugate plane is preferred. Especially a silicon atom is preferable.

(Example of Photosensitizer)

As described above, the photosensitizer having the ability to generate singlet oxygen has been described above, but the following is an example of a preferable compound included in the photosensitizer having the structure represented by Formula (1). Examples of a photosensitizer having a structure represented by Formula (1F) and Formula (1G) are shown in Table I.

In addition, M, $Q_1$, $Q_2$, $R_1$, $R_2$, $R_3$ and $R_4$ described in Table I are M, $Q_1$, $Q_2$, $R_1$, $R_2$, $R_3$ and $R_4$ in the following Formula (1F) and Formula (1G). These are synonymous with M, $Q_1$, $Q_2$, $R_1$, $R_2$, $R_3$ and $R_4$ in Formula (1). Structural formulas (1) and (2) are also shown below.

TABLE I

| Photosensitizer No. | Formula | M | $Q_1$ | $Q_2$ | $R_1$ | $R_2$ | $R_3$ | $R_4$ |
|---|---|---|---|---|---|---|---|---|
| F- 1 | (1F) | Si | Structural formula (1) | *—OH | H | H | H | H |
| F- 2 | (1F) | Si | *—OH | *—OH | H | H | H | H |
| F- 3 | (1F) | Si | *—OH | *—OH | Bu-t | Bu-t | Bu-t | Bu-t |
| F- 4 | (1F) | Si | *—OH | *—OH | OEt | OEt | OEt | OEt |
| F- 5 | (1F) | Si | *—OH | *—OH | H | OEt | H | OEt |
| F- 6 | (1F) | Si | Structural formula (2) | *—OH | Bu-t | Bu-t | Bu-t | Bu-t |
| F- 7 | (1F) | Si | *—$OSi(CH_3)_3$ | *—$OSi(CH_3)_3$ | H | H | H | H |
| F- 8 | (1F) | Si | *—$OSi(C_2H_5)_3$ | *—$OSi(C_2H_5)_3$ | H | H | H | H |
| F- 9 | (1F) | Si | *—$OSi(C_3H_7\text{-n})_3$ | *—$OSi(C_3H_7\text{-n})_3$ | H | H | H | H |

TABLE I-continued

| Photosensitizer No. | Formula | M | $Q_1$ | $Q_2$ | $R_1$ | $R_2$ | $R_3$ | $R_4$ |
|---|---|---|---|---|---|---|---|---|
| F-10 | (1F) | Si | *—$OSi(C_6H_{13}$-n$)_3$ | *—$OSi(C_6H_{13}$-n$)_3$ | H | H | H | H |
| F-11 | (1F) | Si | *—$OSi(C_8H_{17}$-n$)_3$ | *—$OSi(C_8H_{17}$-n$)_3$ | H | H | H | H |
| F-12 | (1F) | Si | *—$OSi(C_8H_{17}$-n$)_3$ | *—$OSi(C_8H_{17}$-n$)_3$ | Cl | Cl | Cl | Cl |
| F-13 | (1F) | Si | *—$OSi(CH_3)_2(C_{18}H_{37}$-n) | *—$OSi(CH_3)_2(C_{18}H_{37}$-n) | H | H | H | H |
| F-14 | (1F) | Si | *—$OSi(CH_3)_3$ | *—$OSi(C_2H_5)_3$ | H | H | H | H |
| F-15 | (1F) | Si | *—$OSi(C_8H_{17}$-n$)_3$ | *—$OSi(C_8H_{17}$-n$)_3$ | H | H | H | H |
| F-16 | (1F) | Ge | *—$OSi(C_2H_5)_3$ | *—$OSi(C_2H_5)_3$ | H | H | H | H |
| F-17 | (1F) | Sn | *—$OSi(C_2H_5)_3$ | *—$OSi(C_2H_5)_3$ | H | H | H | H |
| G- 1 | (1G) | Si | *—OH | *—OH | Bu-t | Bu-t | Bu-t | Bu-t |
| G- 2 | (1G) | Si | *—OH | *—OH | H | H | H | H |
| G- 3 | (1G) | Si | *—$OSi(CH_3)_3$ | *—$OSi(CH_3)_3$ | H | H | H | H |
| G- 4 | (1G) | Si | *—$OSi(C_2H_5)_3$ | *—$OSi(C_2H_5)_3$ | H | H | H | H |
| G- 5 | (1G) | Si | *—$OSi(C_3H_7$-n$)_3$ | *—$OSi(C_3H_7$-n$)_3$ | H | H | H | H |
| G- 6 | (1G) | Si | *—$OSi(C_6H_{13}$-n$)_3$ | *—$OSi(C_6H_{13}$-n$)_3$ | H | H | H | H |
| G- 7 | (1G) | Si | *—$OSi(CH_3)_2(C_{18}H_{37}$-n) | *—$OSi(CH_3)_2(C_{18}H_{37}$-n) | H | H | H | H |
| G- 8 | (1G) | Si | *—$OSi(C_3H_7$-n$)_3$ | *—$OSi(C_3H_7$-n$)_3$ | H | H | H | H |

Formula (1F)

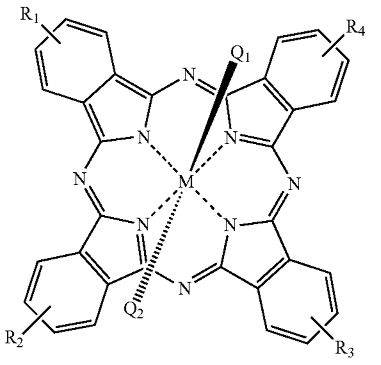

Formula (1G)

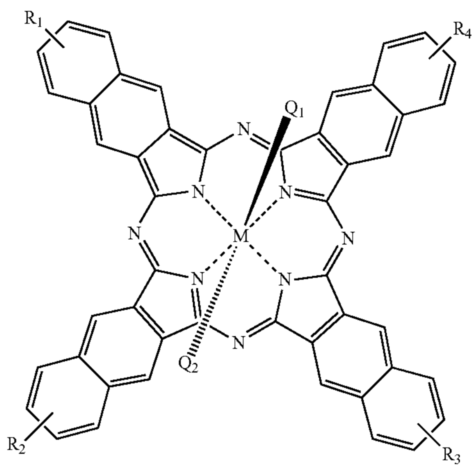

-continued

Structural formula (1)

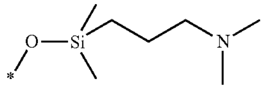

Structural formula (2)

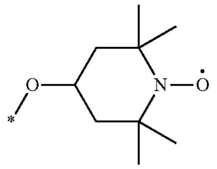

Next, examples other than the photosensitizers having the structure represented by Formula (1) are shown. As an example of the above, Table II shows examples of a photosensitizer having a structure represented by Formula (H).

In addition, M', Q1', $R_1$, $R_2$, $R_3$ and $R_4$ described in Table II represent M', Q1', $R_1$, $R_2$, $R_3$ and $R_4$ in the following Formula (H). Note that M' represents a metal atom other than Group 14 or hydrogen ($H_2$). Q1' is synonymous with Q1 and Q2 in Formula (1). Further, $R_1$, $R_2$, $R_3$ and $R_4$ are synonymous with $R_1$, $R_2$, $R_3$ and $R_4$ in Formula (1), respectively.

Formula (H)

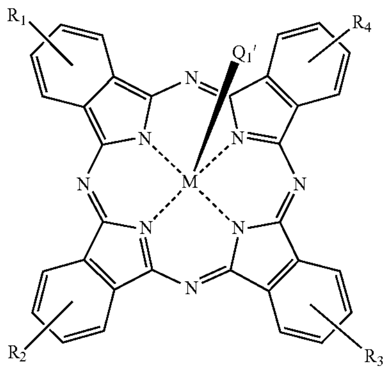

TABLE II

| Photosensitizer No. | Formula | M' | $Q_1'$ | $R_1$ | $R_2$ | $R_3$ | $R_4$ |
|---|---|---|---|---|---|---|---|
| H-1 | (H) | Al | *—OH | Bu-t | Bu-t | Bu-t | Bu-t |
| H-2 | (H) | Al | *—$OSi(C_8H_{17}\text{-}n)_3$ | H | H | H | H |
| H-3 | (H) | Ga | *—OH | Bu-t | Bu-t | Bu-t | Bu-t |
| H-4 | (H) | Ga | *—$OSi(C_8H_{17}\text{-}n)_3$ | H | H | H | H |
| H-5 | (H) | Ti | *═O | Bu-t | Bu-t | Bu-t | Bu-t |
| H-6 | (H) | Cu | — | Bu-t | Bu-t | Bu-t | Bu-t |
| H-7 | (H) | $H_2$ | — | Bu-t | Bu-t | Bu-t | Bu-t |

Examples other than photosensitizers having the structures represented by the above Formula (1F), Formula (1G) and Formula (H) are also shown below.

A-1

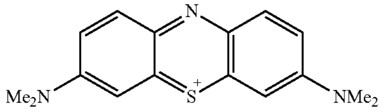

B-1

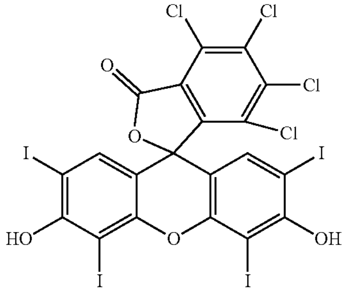

C-1

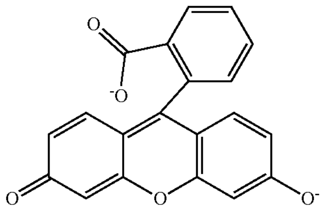

D-1

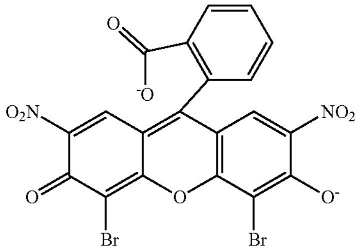

-continued

E-1

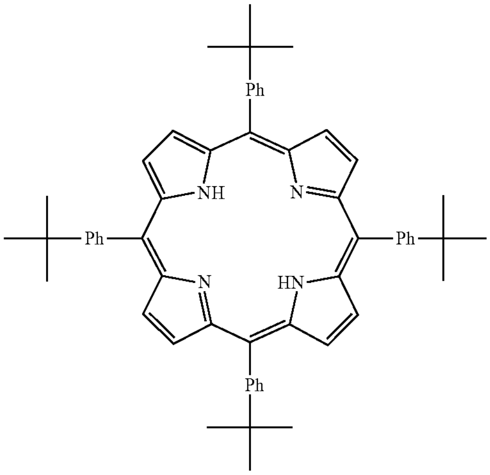

E-2

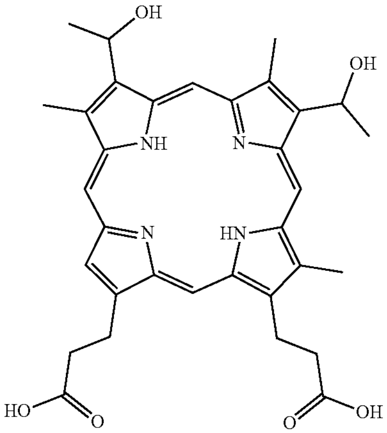

-continued

E-3

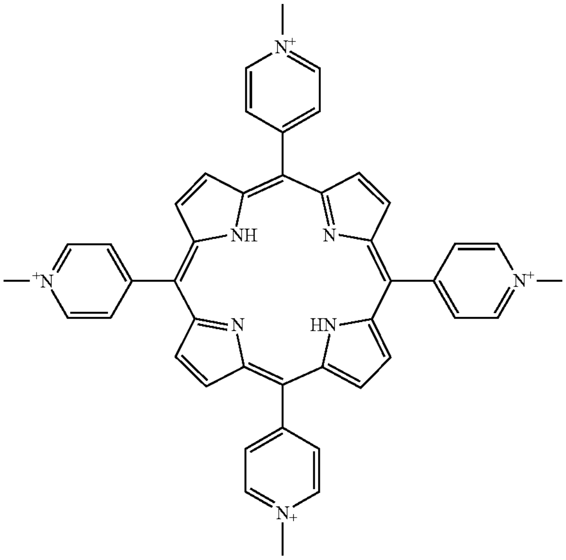

I-1

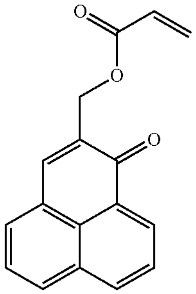

I-2

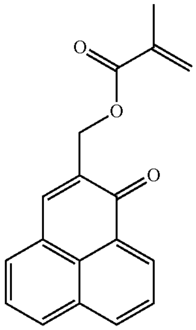

(1.3) External Additive (Metal Oxide Particles)

The electrostatic charge image developing toner of the present invention contains toner particles prepared by attaching an external additive such as a fluidity agent or cleaning aid to the toner matrix particles to improve fluidity, chargeability, and cleanability.

In the present invention, a photosensitizer having a singlet oxygen generating ability is contained inside the toner matrix particles or in an external additive attached to the toner matrix particles.

Examples of the metal oxide particles used as an external additive include inorganic oxide fine particles such as silica fine particles, alumina fine particles, and titanium oxide fine particles, inorganic stearic acid compound fine particles such as aluminum stearate fine particles and zinc stearate fine particles, and inorganic titanic acid compound fine particles such as strontium titanate and zinc titanate. These may be used alone or in combination of two or more.

It is also preferable that these inorganic fine particles are surface treated with a silane coupling agent, a titanium coupling agent, a higher fatty acid, or a silicone oil to improve their thermal storage resistance and environmental stability.

The total amount of the above metal oxide particles added is preferably in the range of 0.05 to 5 parts by mass per 100 parts by mass of the toner. More preferably, it is in the range of 0.1 to 3 parts by mass.

It is more preferable from the viewpoint of expressing the effect of the present invention that the metal oxide particles contain a compound having the structure represented by the following Formula (2) itself or a reactant of the compound represented by Formula (2) formed by reacting with an atom or a functional group contained in the metal oxide particles to form a bond.

$$PS\text{—}(OH)_n \qquad \text{Formula (2):}$$

In Formula (2), PS represents a photosensitizer having a singlet oxygen generating ability. n is an integer.

Examples of the metal oxide particles containing a compound having the structure represented by Formula (2) include a case where a compound having a structure represented by the general formula (2) is contained in metal oxide particles in a state of being adsorbed by physical interaction, that is, a case of physical adsorption, and a case where a compound having a structure represented by Formula (2) is condensed with, for example, an OH group on the surface of a metal oxide particle, and the PS moiety of the general formula (2) is bonded to the particle via an oxygen atom, that is, a case of chemical adsorption.

It is preferred from the viewpoint of thermal stability that PS in the Formula (2) is a phthalocyanine dye or an analog thereof.

It is also more preferable from the viewpoint of expressing the effect of the present invention to include a compound having the structure represented by the following Formula (2a) in the same state as the compound having the structure represented by the above Formula (2).

$$PS\text{-}[E(Z)_n]_k \qquad \text{Formula (2A):}$$

In Formula (2A), PS represents a photosensitizer having a singlet oxygen generation ability. k represents an integer of 1 to 6. E represents a Si atom or a Ti atom. Z represents an alkoxy group, an aryloxy group, a halogen atom, a hydroxy group, or a hydrogen atom. n represents a number in which Z can be replaced with E, and when n is 2 or more, a plurality of Zs may be the same or different, but not all represent hydrogen atoms at the same time. Further, the bond between PS and E may be a covalent bond or a coordinate bond.

(1.4) Binder Resin

A binding resin (also referred to as a "binding resin") refers to a resin that is used as a medium or matrix to disperse and retain the internal additives (a mold release agent, a charge control agent, and a pigment) and external additives (silica and titanium oxide) contained in toner particles, and that has the function of bonding to a recording medium (e.g. paper) during toner image fixing process. The binder resins that constitute the electrostatic charge image developing toner of the present invention are not particularly limited. Examples thereof include vinyl polymers such as a styrene resin, an acrylic resin, a styrene-acrylic copolymer resin, an olefin resin, a polyester resin, a silicone resin, an amide resin and an epoxy resin. In particular, in order to improve the transparency and the color reproducibility of the superimposed image, a styrene-acrylic copolymer resin having high transparency, low viscosity in melting characteristics and high sharp melting property is preferably mentioned. These may be used alone or in combination of two or more types.

(Polymerizable Monomer)

The polymerizable monomer used to form the binder resin used in the preparation step of resin fine particle dispersion liquid described later is not particularly limited as long as it is a polymerizable monomer capable of forming a desired binder resin.

When a vinyl polymer such as a styrene resin, an acrylic resin, or a styrene-acrylic copolymer resin is desired as the binder resin, examples of the polymerizable monomer are as follows: styrene and styrene derivatives such as styrene, o-methylstyrene m-methylstyrene, p-methylstyrene, α-methylstyrene, p-phenylstyrene, and p-ethylstyrene, 2,4-dimethylstyrene, p-tert-butylstyrene, p-n hexylstyrene, p-n-octylstyrene, p-nonylstyrene styrene, p-n-decylstyrene, and p-n-dodecylstyrene; methacrylate ester derivative such as methyl methacrylate, ethyl methacrylate, n-butyl methacrylate, isopropyl methacrylate, isobutyl methacrylate, t Butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate; acrylate ester derivatives such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; olefins such as ethylene, propylene, isobutylene; vinyl fluorides such as vinyl fluoride and vinylidene fluoride; vinyl esters such as vinyl propionate, vinyl acetate, vinyl benzoate; vinyl ethers such as vinyl methyl ether and vinyl ethyl ether; vinyl ketones such as vinyl methyl ketone, vinyl ethyl ketone, vinyl hexyl ketone; N-vinyl compounds such as N-vinylcarbazole, N-vinylindole and N-vinylpyrrolidone; vinyl compounds such as vinylnaphthalene and vinylpyridine; vinyl monomers such as acrylonitrile, methacrylonitrile and acrylic acid or methacrylic acid derivatives such as acrylamide. These vinyl monomers may be used alone or in combination of two or more.

It is also preferable to use a combination of polymerizable monomers having an ionic dissociative group. Polymerizable monomers having an ionic dissociative group are those having substituents such as a carboxy group, a sulfonic acid group, and a phosphoric acid group, as a constituent group. Specific examples include acrylic acid, methacrylic acid, maleic acid, itaconic acid, silicic acid, fumaric acid, maleic acid monoalkyl ester, itaconic acid monoalkyl ester, styrenesulfonic acid, arylsulfosuccinic acid, 2-acrylamido-2-methylpropanesulfonic acid, and acid phosphooxyethyl methacrylate.

Further, it is also possible to obtain a binder resin having a crosslinked structure by using polyfunctional vinyls such as divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, and neopentyl glycol diacrylate as a polymerizable monomer.

(Molecular Weight)

The molecular weight of the binder resin constituting the electrostatic charge image developing toner of the present invention is determined by gel permeation chromatography (GPC) of the THF soluble portion. The number average molecular weight (Mn) by GPC is preferably 3,000 to 6,000, more preferably 3,500 to 5,500. The ratio of weight average molecular weight (Mw) to number average molecular weight (Mn), Mw/Mn is preferably in the range of 2.0 to 6.0, more preferably, it is in the range of 2.5 to 5.5.

Molecular weight measurements by GPC were performed as follows. A GPC device HLC-8220 (manufactured by Tosoh Corporation) and the columns "TSK guardcolumn+TSK gel Super HZ-M triple" (manufactured by Tosoh Corporation) were used. The column temperature was maintained at 40° C. and tetrahydrofuran (THF) was flowed at a rate of 0.2 mL/min.

Then, the measured sample was treated with an ultrasonic dispersion machine at room temperature for 5 minutes under dissolution conditions to reach a concentration of 1 mg/mL dissolved in tetrahydrofuran.

The sample solution was then processed through a membrane filter with a pore size of 0.2 μm to obtain a sample solution, and 10 μL of this sample solution was injected with the above carrier solvent. The molecular weight distribution of the sample was calculated using a calibration curve measured with monodisperse polystyrene standard particles.

The standard polystyrene samples for calibration curves was made by Pressure Chemical Corporation with a molecular weight of $6\times10^2$, $2.1\times10^3$, $4\times10^3$, $1.75\times10^4$, $5.1\times10^4$, $1.1\times10^5$, $3.9\times10^5$, and $8.6\times10^5$, $2\times10^6$, and $4.48\times10^6$ respectively. At least 10 standard polystyrene samples were measured to create a calibration curve. A refractive index detector was used as a detector.

(Softening Point)

The binder resin for the present invention preferably has a softening point in the range of 75 to 112° C., more preferably in the range of 80 to 100° C. By having the softening point of the electrostatic charge image developing toner within the above range, an appropriate melting state of the electrostatic charge image developing toner may be obtained in the fixing process, and high color reproducibility may be obtained for the secondary colors.

The term "appropriate melting state of the electrostatic charge image developing toner" means that when a color image is formed by superimposing a toner image of an electrostatic charge image developing toner together with a toner image of another color, for example, a cyan colorant contained in the toner image of the electrostatic charge image developing toner and a magenta colorant contained in the toner image of the electrostatic charge image developing toner are uniformly dispersed together in the color image region in which the colors are superimposed and fixed on the recording material, in a state where the interface between the layers due to the binder resin disappears, and the color is developed and the cyan colorant does not bleed out to the area outside the color image area.

For example, when a cyan toner is used as a toner for developing an electrostatic charge image, it may be used together with a yellow toner, a magenta toner, and a black toner to form color images. It is preferable that such yellow toner, magenta toner, and black toner are designed so that their softening points, glass transition points, and particle sizes are the same as those of cyan toner.

Here, the softening point of the electrostatic charge image developing toner is measured as follows. That is, first, under the environment of 20° C. and 50% RH, 1.1 g of cyan toner is placed in a petri dish, flattened, and left for at least 12 hours.

Then, it is pressurized with a force of 3820 $kg/cm^2$ for 30 seconds by a molding machine "SSP-10A" (manufactured by Shimadzu Corporation) to prepare a cylindrical molded sample having a diameter of 1 cm.

The molded sample is then tested in a flow tester "Flow Tester CFT-500D ((manufactured by Shimadzu Corporation), with conditions of load 196 N (20 kgf), starting temperature 60° C., preheating time 300 seconds, temperature increase rate 6° C./min in an environment of 24° C. and 50% RH. From the end of preheating, the samples is extruded from the hole of the cylindrical die (1 mm diameter×1 mm) using a piston with a diameter of 1 cm. The offset method temperature $T_{offset}$ measured by the melting temperature measuring method of the temperature rising method with an offset value of 5 mm is used as a softening point of the electrostatic charge image developing toner.

(Glass Transition Point)

The binder resin for the present invention preferably has a glass transition point (Tg) in the range of 20 to 90° C., more preferably in the range of 35 to 65° C.

The glass transition point (Tg) of the electrostatic charge image developing toner is determined by a differential scanning calorimeter "DSC-7" (PerkinElmer, Inc.) and a thermal analyzer controller "TAC7/DX" (PerkinElmer, Inc.).

Specifically, 4.50 mg of toner is sealed in an aluminum pan "KIT NO. 0219-0041", and this is set in a sample holder of "DSC-7". An empty aluminum pan is used for the reference measurement. Under the measurement conditions of a temperature range of 0 to 200° C., a temperature increase rate of 10° C./minute, and a temperature decrease rate of 10° C./minute, Heat-Cool-Heat temperature control is performed. The data at its second Heat is obtained. The intersection of the extension of the baseline before the rise of the first endothermic peak and the tangent line showing the maximum slope between the rising portion of the first endothermic peak and the peak apex is shown as a glass transition point (Tg). When the 1st Heat is made, the temperature is held at 200° C. for 5 minutes.

(1.5) Mold Release Agent

The mold release agent used in the preparation of the electrostatic charge image developing toner of the present invention is not particularly limited. Examples thereof includes polyethylene wax, oxidized polyethylene wax, polypropylene wax, oxidized polypropylene wax, Carnauba wax, Sasol wax, rice wax, and Candelilla wax, Jojoba oil wax, and bees wax.

The ratio of the mold release agent in the toner particles is usually in the range of 0.5 to 5 parts by mass, and more preferably it is in the range of 1 to 3 parts by mass per 100 parts by mass of the binder resin. When the mold release agent content is less than 0.5 parts by mass to 100 parts by mass of the binder resin, the anti-offset effect is not sufficient. When the ratio is greater than 5 parts by mass to 100 parts by mass of the binder resin, the resulting toner has poor translucency and poor color reproducibility.

(Melting Point)

The melting point of the mold release agent is preferably in the range of 60 to 90° C. This ensures a balance between thermal storage resistance and fixing performance, as well as toner productivity.

(1.6) Colorant

In the toner matrix particles according to the present invention, a combination of dyes and pigments commonly known as colorants may be used as colorants.

The colorant for the present invention may be one or more than one type. In the present invention, the coloring agent is not limited to compounds of a specific structure as long as it does not affect the antibacterial and antiviral effects. When an aggregate of a phthalocyanine dye having an axial ligand, which is a photosensitizer preferably used in the present invention, is used as a colorant, excessive aggregation is suppressed. Therefore, the absorption spectrum is relatively sharp and has an advantage of being able to express a wide color gamut. These have been confirmed by the experiment of the present inventor.

Examples of typical colorants include colorants for magenta, yellow, cyan, and black.

Examples of the colorant for magenta include C.I. Pigment Red 2, 3, 5, 6, 7, 15, 16, 48:1, 53:1, 57:1, 60, 63, 64, 68, 81, 83, 87, 88, 89, 90, 112, 114, 122, 123, 139, 144, 149, 150, 163, 166, 170, 177, 178, 184, 202, 206, 207, 209, 222, 238 and 269.

Examples of the colorant for yellow include C.I. Pigment Orange 31, 43, and Pigment Yellow 12, 14, 15, 17, 74, 83, 93, 94, 138, 155, 162, 180 and 185.

Examples of the colorant for cyan include C.I. Pigment Blue 2, 3, 15, 15:2, 15:3, 15:4, 16, 17, 60, 62, and 66 and C.I. Pigment Green 7.

Examples of the colorant for black include carbon black and magnetic particles.

Examples of the carbon black include channel black, furnace black, acetylene black, thermal black and lamp black.

Examples of the magnetic material for magnetic particles include ferromagnetic metals such as iron, nickel, and cobalt; alloys containing these metals, compounds of ferromagnetic metals such as ferrite and magnetite; chromium dioxide; and alloys that do not contain ferromagnetic metals but exhibit ferromagnetic properties when heat treated.

Examples of the alloy that exhibits ferromagnetism upon heat treatment include Heusler alloys such as manganese-copper-aluminum and manganese-copper-tin.

The content of the above colorant in the above toner matrix particles may be determined appropriately and independently. For example, from the viewpoint of ensuring color reproducibility of images, it is preferable to be in the range of 1 to 30 mass %, more preferably in the range of 2 to 20 mass %.

The size of the colorant particles is preferably in the range of, for example, 10 to 1,000 nm, more preferably in the range of 50 to 500 nm, and still more preferably in the range of 80 to 300 nm in terms of volume average particle size.

The volume average particle diameter may be a catalog value, and for example, the volume average particle diameter (volume-based median diameter) of a colorant is measured by "UPA-150" (manufactured by MicrotracBEL Corp.).

(1.7) Surfactant

In the colorant dispersion preparation step and/or binder resin fine particle polymerization step described below, a surfactant may be added to the aqueous medium in order to stably disperse the fine particles in the aqueous medium. As such surfactants, various conventionally known anionic, cationic, and nonionic surfactants may be used.

Examples of the anionic surfactant include higher fatty acid salts such as sodium oleate; alkyl arylsulfonates such as sodium dodecylbenzene sulfonate; alkyl sulfates such as sodium lauryl sulfate; polyoxyethylene alkyl ether sulfate esters such as polyethoxyethylene lauryl ether sodium sulfate; alkyl sulfosuccinic acid ester salts such as sodium monooctyl sulfosuccinate, sodium dioctyl sulfosuccinate, sodium polyoxyethylene lauryl sulfosuccinate, and derivatives thereof.

Examples of the cationic surfactant include aliphatic amine salt, aliphatic quaternary ammonium salt, benzalkonium salt, benzethonium chloride, pyridinium salt, and imidazolinium salt.

In addition, examples of the nonionic surfactant include polyoxyethylene alkyl ethers such as polyoxyethylene lauryl ether and polyoxyethylene stearyl ether; polyoxyethylene alkyl phenyl ethers such as polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monostearate; glycerin higher fatty acid esters such as oleic acid monoglyceride and stearic acid monoglyceride; and polyoxyethylene-polyoxypropylene-block copolymer.

(1.8) Charge Control Agent

The charge control agent applicable to the toner matrix particles according to the present invention is not particularly limited as long as it is a substance that may be positively or negatively charged by triboelectric charging and is colorless. Various known positively charged charge control agents and negatively charged charge control agents may be used.

The amount of the charge control agent added is usually in the range of 0.1 to 10 mass %, preferably 0.5 to 5 mass % with respect to 100 mass % of the toner matrix particles finally obtained.

The size of the charge control agent particles is preferably in the range of 10 to 1,000 nm, more preferably in the range of 50 to 500 nm, and still more preferably in the range of 80 to 300 nm in terms of number average primary particle diameter.

(1.9) Polymerization Initiator

As a polymerization initiator used in the resin fine particle dispersion preparation step described below, any water-soluble polymerization initiator may be used. Specific examples of the polymerization initiator include persulfates (potassium persulfate, ammonium persulfate), azo compounds (4,4'-azobis-4-cyanovaleric acid and salts thereof, 2,2'-azobis(2-amidinopropane) salt, and peroxide compounds.

(1.10) Chain Transfer Agent

In the resin fine particle dispersion preparation step, commonly used chain transfer agents may be used for the purpose of adjusting the molecular weight of the binder resin. The chain transfer agent is not particularly limited, and examples thereof include mercaptans such as 2-chloroethanol, octyl mercaptan, dodecyl mercaptan, and t-dodecyl mercaptan, and styrene dimers.

(1.11) Coagulant

Examples of the coagulant used in the salting out, aggregation, and fusion steps include alkali metal salts and alkaline earth metal salts.

Alkali metals that constitute the coagulant include lithium, potassium, and sodium.

Alkaline earth metals that constitute the coagulant include magnesium, calcium, strontium, and barium. Of these, potassium, sodium, magnesium, calcium, and barium are preferred.

Examples of the counter ion (anions constituting the salt) of the aforementioned alkali metal or alkaline earth metal include chloride ion, bromide ion, iodide ion, carbonate ion, and sulfate ion.

(1.12) Developer

The electrostatic charge image developing toner of the present invention may be used as a magnetic or non-magnetic one-component developer, or may be mixed with a carrier and used as a two-component developer.

When the toner is used as a two-component electrostatic charge image developer, magnetic particles made of conventionally known materials such as iron, ferrite, magnetite and other metals, and alloys of such metals with aluminum, lead and other metals may be used as carriers, with ferrite particles being particularly preferred.

The carrier may be a coated carrier in which the surface of the magnetic particles is coated with a coating agent such as a resin, or a binder-type carrier in which the magnetic fine powder is dispersed in a binder resin.

The coating resin that constitutes the coated carrier are not limited. Examples thereof include an olefin resin, a styrene resin, a styrene-acrylic resin, a silicone resin, an ester resin, and a fluoropolymer.

As resins constituting resin-dispersion type carriers, known resins may be used without any particular limitation. For example, a styrene-acrylic resin, a polyester resin, a fluoropolymers, and a phenolic resin may be used.

The volume-based median diameter of the carrier is preferably in the range of 20 to 100 μm, more preferably it is in the range is 20 to 60 μm. The volume-based median diameter of carriers is typically measured by a laser diffraction particle size analyzer "HELOS" ((manufactured by SYMPATEC GmbH) equipped with a wet dispersion machine.

Preferred carriers include coated carriers that use a silicone resin, a copolymerization resin (graft resin) of organopolysiloxane and vinyl monomer, or a polyester resin as coating resin from the viewpoint of spent resistance. In particular, from the viewpoints of durability, environmental stability, and spent resistance, coated carriers are preferably coated with a resin obtained by reacting isocyanate with a copolymerization resin (graft resin) of organopolysiloxane and a vinyl monomer.

2. Production Method of Electrostatic Charge Image Developing Toner

The production method of the electrostatic charge image developing toner of the present invention is characterized in containing the step of dispersing the photosensitizer in a monomolecular state.

As a general method for producing an electrostatic charge image developing toner, there is a method (conventional pulverization method) in which a binder resin and a colorant are dissolved in a soluble solvent, and then the solvent is removed and incorporated into the binder resin. A pulverized toner produced by this method is made by mixing a binder resin and a colorant, melting and blending the mixture, and then going through the pulverization and classification process, so the colorant is incorporated into the toner as an aggregate.

Another method (conventional polymerization method) is to polymerize a binder resin monomer in which a colorant is dissolved in advance, and use polymerized fine particles in which the colorant is dissolved. In the case of polymerized toners produced by this method, the polymerized binder resin particles and a colorant dispersion are aggregated to produce a toner, and the colorant is incorporated into the toner as an aggregate.

The electrostatic charge image developing toner of the present invention is suitably produced by a production method having a step of dispersing a photosensitizer in a monomolecular state, instead of the above-mentioned producing methods as in the conventional case.

In order to incorporate the photosensitizer into the electrostatic charge image developing toner in the monomolecular state, it is necessary that the aggregated solid dye is dissolved in a solvent or resin to convert it into the monomolecular state, and the photosensitizer is incorporated into the binder resin in the monomolecular state, or otherwise, metal oxide fine particles carrying the photosensitizer are prepared, and the photosensitizer is incorporated into the toner particles or the photosensitizer is contained in an external additive, and the photosensitizer is attached to the surface of the toner matrix particles.

Specifically, the following methods are used.

(1) After dissolving the binder resin and photosensitizer in a soluble solvent, the solvent is removed to incorporate the photosensitizer in a monomolecular state into the binder resin (pulverizing method using the method of the present invention).

(2) A method of polymerizing a binder resin monomer in which a photosensitizer is dissolved in advance and using polymerized fine particles in which a monomolecular photosensitizer is dissolved (polymerization method using the method of the present invention).

(3) A method in which metal oxide fine particles having a reactive group and carrying a photosensitizer in which a solvent-soluble photosensitizer molecule is bonded or adsorbed on the surface of the metal oxide fine particles in a monomolecular state are prepared, then, a photosensitizer is incorporated into the toner particles together with the metal oxide particles at the time of producing the toner matrix particles, or the metal oxide particles are contained in the external additive and adhered to the surface of the toner matrix particles (the method of the present invention other than the method described above).

Among the above methods, as a method for producing the electrostatic charge image developing toner of the present invention, it is necessary to obtain an electrostatic charge image developing toner having a small particle size in order to achieve high image quality of the image. It is preferable to use the method (2) or (3) from the viewpoint of production cost and production stability.

(Example of Toner Production Method: Production Method 1)

A toner production method by the method (1) contains known steps such as [a resin fine particle preparation step], [a mixing step], [a toner particle preparation step: kneading, pulverizing and classification steps] and [an external additive treatment step]. This is a method for producing toner particles by adding a photosensitizer in a state where singlet oxygen may be generated in the [mixing step] among these steps.

(Example of Toner Production Method: Production Method 2)

A toner production method by the method (2) contains a step of mixing a dispersion of fine particles polymerized with a binder resin monomer in which a photosensitizer is dissolved in a state capable of generating singlet oxygen in advance, a dispersion of colorant fine particles, and a dispersion of other constituents of the toner such as another mold release agent when needed. At that time, the particles are slowly aggregated while balancing the repulsive force on the surface of the fine particles by adjusting the pH and the cohesive force due to the addition of the coagulant composed of the electrolyte, and the association is performed while controlling the average particle size and the particle size distribution. At the same time, the fusion between the fine particles is performed by heating and agitation to control the shape to result in producing toner particles.

The resin fine particles may be composed of two or more layers made of binder resin having different compositions. In this case, a polymerization initiator and a polymerizable monomer are added to a dispersion liquid of the first resin fine particles prepared by the emulsion polymerization treatment (first stage polymerization) according to a conventional method. A method of polymerizing this system (second stage polymerization) may be adopted. For example, the production step for obtaining the product by the method described above contains the following steps.

[Preparation Step of Resin Fine Particle Dispersion Liquid]

A photosensitizer is dissolved in advance in a binder resin in a state where singlet oxygen may be generated. A polymerizable monomer solution is prepared by dissolving or dispersing toner particle constituent materials such as a mold release agent and a charge control agent in the polymerizable monomer by which the binder resin is formed, if necessary. This is added to an aqueous medium, and mechanical energy is applied to form oil droplets, followed by performing polymerization reaction in the oil droplets using radicals from a water-soluble radical polymerization initiator to obtain a dispersion liquid of resin fine particles loaded with a photosensitizer.

As a method of incorporating a mold release agent in the toner particles, it may be cited a method of configuring the binder resin fine particles as containing the mold release agent, or a method of adding a dispersion liquid in which mold release agent fine particles are dispersed in an aqueous medium is added in the salting out, aggregation, and fusion steps. Thereby salting out, aggregating, and fusing of the binder resin fine particles, the colorant fine particles, and the mold release agent fine particles are performed. A combination of these methods may also be used.

As a method of incorporating the charge control agent in the toner particles, the same method as the method of incorporating the mold release agent shown above may be mentioned.

The binder resin fine particles in the dispersion liquid prepared in the resin fine particle dispersion liquid preparation step preferably have a median diameter based on the volume in the range of 50 to 300 nm.

In the preparation step of resin fine particle dispersion liquid, a surfactant may be added to the aqueous medium to stably disperse the fine particles in the aqueous medium, and various conventionally known anionic surfactants, cationic surfactants, and nonionic surfactants may be used as such surfactants.

The disperser for dispersing oil droplets by mechanical energy is not particularly limited. Examples thereof include a stirrer “CLEARMIX” (manufactured by M-Technique Co., Ltd.) equipped with a rotor that rotates at high speed, an ultrasonic disperser, a mechanical homogenizer, a Manton-Gaulin homogenizer, and a pressure homogenizer.

The above-mentioned “aqueous medium” refers to a medium composed of water in the range of 50 to 100 mass % and a water-soluble organic solvent in the range of 0 to 50 mass %.

Examples of the water-soluble organic solvent include methanol, ethanol, isopropanol, butanol, acetone, methyl ethyl ketone, and tetrahydrofuran. Among them, alcohol-based organic solvents that do not dissolve the resulting resin are preferred.

[Preparation Step of Colorant Dispersion Liquid]

This is a step of obtaining a dispersion liquid of colorant fine particles, in which colorant fine particles containing a colorant are dispersed in an aqueous medium.

In the preparation step of colorant dispersion liquid, a colorant compound is added to an aqueous medium and mechanical energy is applied to it to prepare a dispersion liquid of colorant fine particles in which the colorant fine particles are dispersed in the aqueous medium.

In the preparation step of colorant dispersion liquid, a surfactant may be added to the aqueous medium to stably disperse fine particles in the aqueous medium, and various conventionally known anionic surfactants, cationic surfactants, and nonionic surfactants may be used as such surfactants.

The colorant fine particles in the preparation step of colorant dispersion liquid preferably have a volume-based median diameter in the range of 20 to 1,000 nm. More preferably, it is in the range of 20 to 140 nm, and still more preferably it is the range of 30 to 100 nm. As a method of controlling the median diameter based on the volume of the colorant fine particles in the range of 10 to 500 nm, there is a method of controlling, for example, by adjusting the magnitude of the above-mentioned mechanical energy.

[Toner Particle Forming Step]

In this step, a coagulant is added to an aqueous medium in which the binder resin fine particles and the colorant fine particles are present. By adjusting the temperature, salting out is promoted and at the same time the toner particles are aggregated and fused. This step includes salting out, aggregation, and fusion to form toner particles.

[Filtration and Washing Step]

This is a step of filtering the toner particles from the aqueous medium and removing surfactants and other agents from the toner particles.

[Drying Step]

This is a step of drying the washed toner particles.

[External Additive Adding Step]

This is a step of adding an external additive to the dried toner particles.

(Example of Toner Production Method: Production Method 3)

A toner production method by the method (3) contains the same steps as the production method (2), except that the photosensitizer-loaded metal oxide fine particles in a state capable of generating singlet oxygen are added to the toner particles together with an external additive added in the [external additive adding step]. Here, the photosensitizer-loaded metal oxide fine particles in a state capable of generating singlet oxygen are prepared by the following [preparation step of photosensitizer-loaded metal oxide] which is different from the above [external additive adding step].

[Preparation Step of Photosensitizer-Loaded Metal Oxide]

A reaction solution is prepared by mixing metal oxide particles and a photosensitizer capable of generating singlet oxygen in a soluble solvent in advance, followed by heating and refluxing. The solid obtained by filtering and washing the reaction solution is further vacuum dried to produce photosensitizer-loaded metal oxide fine particles.

(Particle Size)

The average particle diameter of the toner matrix particles in the electrostatic charge image developing toner of the present invention is preferably in the range of 4 to 10 μm in median diameter on a volume basis, and more preferably it is in the range is 6 to 9 μm.

When the volume-based median diameter is within the above range, the transfer efficiency is increased, the image quality of halftone is improved, and the image quality of fine lines and dots is improved. The average particle size may be controlled by the concentration of the coagulant (salting out agent) used, the amount of organic solvent added, the fusion time, and the composition of the polymer.

The volume-based median diameter of the toner matrix particles is measured and calculated using a measurement device "Coulter Counter Multisizer 3" (Beckman Coulter Corporation) to which a computer system for data processing (Beckman Coulter Corporation) is connected.

Specifically, 0.02 g of toner is added to 20 mL of a surfactant solution (for example, a surfactant solution in which a neutral detergent containing a surfactant component is diluted 10 times with pure water for the purpose of dispersing the toner) to acclimate.

After that, a toner dispersion is prepared by performing ultrasonic dispersion for 1 minute, and this toner dispersion is placed in a beaker containing "ISOTONII" (manufactured by Beckman Coulter Corporation) in a sample stand with a pipette until the indicated concentration on the measuring device reaches 8%.

By setting the concentration above, reproducible measurement value may be obtained. Then, in the measuring device, the number of measured particles is made to 25,000, the aperture diameter is made to 100 μm, and the frequency value is calculated by dividing the measurement range of 2 to 60 μm into 256. The particle diameter of 50% from the one with the larger volume integrated fraction is defined as the volume-based median diameter.

(Average Circularity)

For the individual toner particles that constitute the electrostatic charge image developing toner of the present invention, from the viewpoint of improving transfer efficiency, the average circularity, calculated from the formula (Circularity=Perimeter of circle calculated from the circle equivalent diameter/Perimeter of projected image of particles), is preferably in the range of 0.930 to 1.000, more preferably in the range of 0.950 to 0.995.

3. Image Forming Method

The image forming method of the present invention uses the above-mentioned electrostatic charge image developing toner, and it is characterized in that dots are formed independently of the image area. Since singlet oxygen is a gas and diffuses into areas other than the print area (non-image area), the antibacterial and antiviral effects may also be achieved in non-image areas by the image forming method using the electrostatic charge image developing toner of the present invention, in which dots are formed independently of the image area. The effect may also be achieved by printing isolated dots with a diameter of 60 μm or less, a size that is not visible.

(Estimated Printing Rate for Singlet Oxygen Diffusion Distance and Antibacterial and Antiviral Effects)

The diffusion distance X of singlet oxygen $^1O_2$ is expressed as in the following equation.

$$X^2=2Dt \quad \text{Equation:}$$

In the above equation, X [m] is a diffusion distance of singlet oxygen, D [$m^2$/sec] is a diffusion coefficient of singlet oxygen, and t [sec] is a lifetime time of the diffusing singlet oxygen.

When an image is formed using the electrostatic charge image developing toner of the present invention, singlet oxygen $^1O_2$ will diffuse up to several hundred mm from the print area.

The singlet oxygen contained in the photosensitizer used in the electrostatic charge image developing toner of the present invention is supposed to be used in air, and its diffusion distance depends on humidity, and the lower the humidity, the more the antibacterial and antiviral effects spread at a lower print rate.

For singlet oxygen molecules in Brownian motion in the atmosphere, the diffusion coefficient of $2\times10^{-5}$ [$m^2$/sec] at 50% humidity, and the lifetime time of diffusing singlet oxygen of $62\times10^{-3}$ [s] were reported. Quoting the reported example figures, the square of the diffusion distance of singlet oxygen ($X^2$) may be calculated from the above equation as $2\times(2\times10^{-5})\times(62\times10^{-3})=2.48\times10^{-6}$ [$m^2$]=2.48 [$mm^2$], and the diffusion distance X of about 1.57 [mm]=1, 570 [μm] is derived.

(Applications and Advantages of Image Forming Method)

When an image is formed using the electrostatic charge image developing toner of the present invention, the singlet oxygen generated may diffuse at least in mm. For example, if the diffusion radius of singlet oxygen is the diffusion distance 1.57, about 1.5 [mm] derived from the above, and if the toner particles are present at intervals of 3 mm, the generated singlet oxygen may be diffused over the entire surface of the recording medium.

The toner particles present on the recording media do not need to be toner particles that form dots; even fog producing toner particles, for example, may exhibit antibacterial and antiviral effects. Considering the results of the above estimation, assuming an environment with a resolution of 1,200 dpi and a humidity of 50% independently of the image are, the electrostatic charge image developing toner of the present invention is used in the form of a clear toner at equal intervals, and if the entire surface is printed with a printing rate of about 0.01%, it is possible to form an image having antibacterial and antiviral effects on the entire surface without depending on the image pattern.

Furthermore, the above image forming method has the advantage that the effect of light transmission inhibition by the toner colorant may be ignored.

If it is a 5-body/6-body machine, the electrostatic charge image developing toner of the present invention is used in the form of a clear toner without changing the developer of 4 colors (CMYK). It may be applied to the device simply by adding the developer to the 5-body/6-body machine.

4. Image Forming System

The image forming system of the present invention uses the aforementioned electrostatic charge image developing toner and image forming method of the present invention, and has the following devices: a charging device for a photoreceptor, a latent image forming device, a developing device, a transfer device, and a cleaning device. It is preferable that the image forming system also have a fixing device to fix the toner image transferred to the transfer material. This is a system for forming images using the electrostatic charge image developing toner of the present invention in an electrophotographic image forming apparatus (hereinafter simply referred to as an "image forming apparatus") capable of implementing each of the above means of the present invention. The following is a description of each device of the imaging system of the present invention.

(Charging Device)

The charging device is a device to charge the photoreceptor by giving it a uniform electric potential. In the charging device, the photoreceptor is charged by using a contact charging roller.

(Latent Image Forming Device: Exposure Device)

The latent image forming device is a device to form an electrostatic latent image corresponding to an image by exposing light based on an image signal on a photosensitive material given a uniform potential by a charging device. As a latent image forming device, one composed of LEDs and imaging elements in which light emitting elements are arranged in an array in the axial direction of the photoreceptor, or a laser optical system is used.

(Developing Device)

The developing device is a device by which an electrostatic latent image is developed by a dry type developer containing an electrostatic charge image developing toner of the present invention to form a toner image. The toner image is formed by using a dry developer containing a toner, for example, using a developing device including a stirrer for frictionally stirring the toner to charge the toner and a rotatable magnet roller. Specifically, in the developing device, for example, a toner and a carrier are mixed and agitated, and the toner is charged by friction during this process and held on the surface of the rotating magnetic roller to form a magnetic brush. Since the magnetic rollers are located near the photoreceptor, some of the toner comprising the magnetic brushes formed on the surface of the magnetic rollers moves to the surface of the photoreceptor by electrical attractive force. As a result, the electrostatic latent image is developed by the toner to form a toner image on the surface of the photoreceptor.

(Transfer Device)

The transfer device transfers the toner image to the transfer material. The transfer of the toner image to the transfer material is performed by peeling and charging the toner image onto the transfer material. For example, a corona transfer device using corona discharge, a transfer belt, or a transfer roller may be used as a transfer device. Further, as the transfer device, for example, an intermediate transfer body is used, and after the toner image is first transferred onto the intermediate transfer body, the toner image is secondarily transferred onto the transfer material. It can also be performed by directly transferring the toner image formed on the photoreceptor to the transfer material. The transfer material is not particularly limited. Examples thereof include plain paper from thin paper to thick paper, coated printing paper such as high-quality paper, art paper or coated paper, commercially available Japanese paper and postcard paper, and plastic film for OHP, and various types such as cloth.

(Fixing Device)

The fixing device is a device of fixing the transfer material on which the toner image has been transferred by, for example, nipping and transporting the material to the fixing nip section between the heated fixing rotor and the pressurizing member for thermal fixing.

(Cleaning Device)

After the transfer step, there is a toner on the photoreceptor that was not used for image formation or remained untransferred. In the cleaning device, the above toner is removed by, for example, a blade, the tip of which is in contact with the photoreceptor that rubs the surface of the photoreceptor.

5. Image Forming Apparatus

An example of an image forming apparatus capable of carrying out the image forming apparatus of the present invention will be described below with reference to the drawing.

Figure 3:
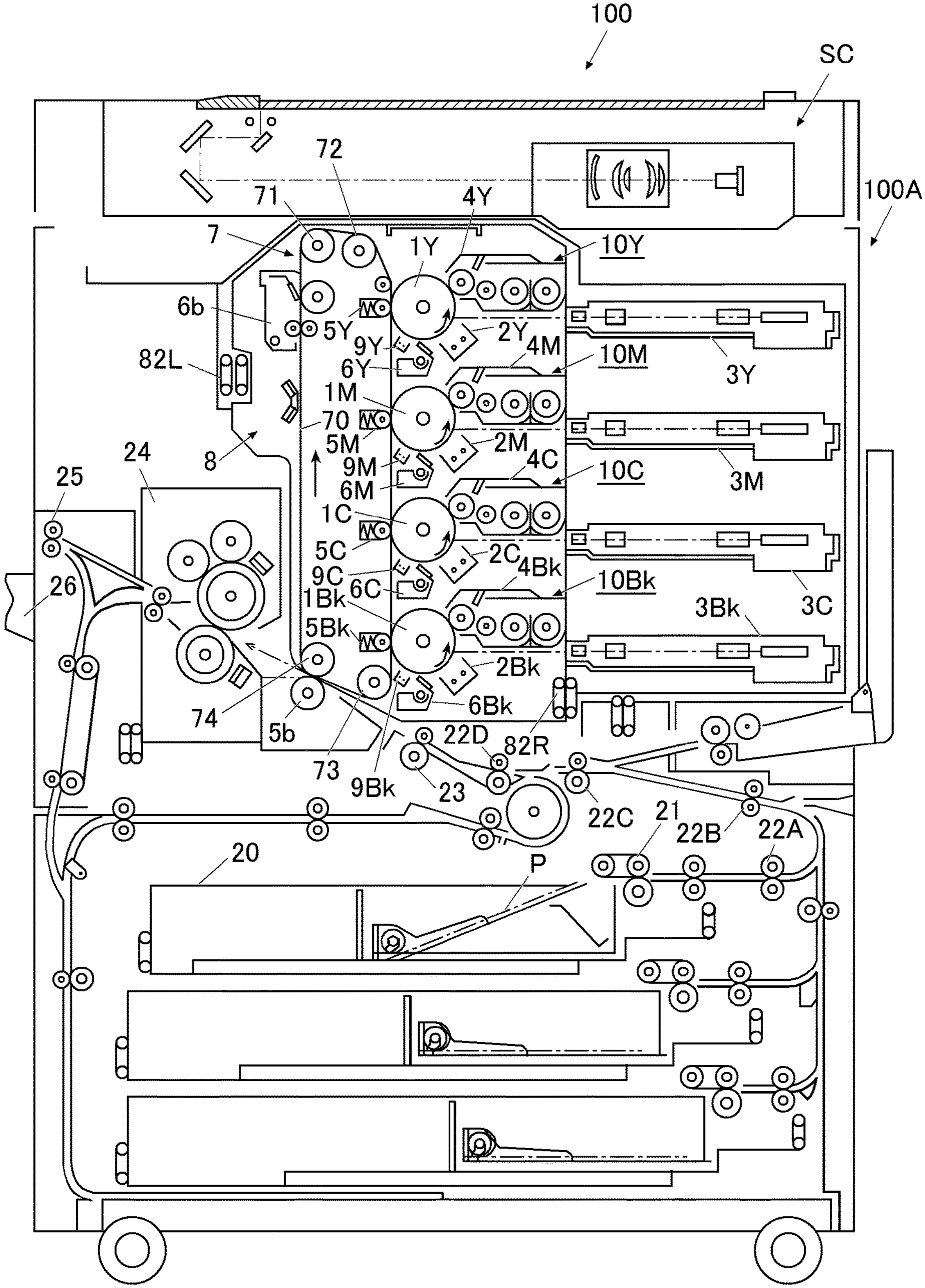
FIG. 3 is a cross-sectional view showing a configuration in an example of an image forming apparatus according to the present invention.

FIG. 3 shows a cross-sectional overview of the configuration in an example of an image forming apparatus according to the present invention. This image forming apparatus 100 is called a tandem-type color image forming apparatus, and has four sets of image forming sections (image forming units) 10Y, 10M, 10C and 10Bk arranged vertically in a vertical column, an intermediate transfer body unit 7, a paper feeding device 21 and a fixing device 24. At the top of the main body 100A of the image forming apparatus 100, the document image reader SC is located.

The intermediate transfer body unit 7 includes an endless belt-shaped intermediate transfer body 70 that may be rotated by winding rollers 71, 72, 73, and 74, a primary transfer roller 5Y, 5M, 5C, 5Bk, and a cleaning device 6*b*.

The four sets of image forming units 10Y, 10M, 10C and 10Bk have drum-shaped photoreceptors 1Y, 1M, 1C and 1Bk as centers, respectively. They have charging devices 2Y, 2M, 2C and 2Bk arranged around the photoreceptor, latent image forming devices (exposure devices) 3Y, 3M, 3C and 3Bk, rotating developing devices 4Y, 4M, 4C and 4Bk, and have cleaning devices 6Y, 6M, 6C and 6Bk for cleaning the photoreceptors 1Y, 1M, 1C and 1Bk.

The image forming units 10Y, 10M, 10C and 10Bk respectively form yellow, magenta, cyan, and black toner images. The charging device, the latent image forming device, and the developing device in the image forming system of the present invention are devices for forming a toner image on the photoreceptor. In the image forming apparatus 100, the toner image formation is carried out using the image forming units 10Y, 10M, 10C, and 10Bk, with the photoreceptors 1Y, 1M, 1C, and 1Bk, and the electrostatic charge image developing toner of the present invention. The toner may be mixed with a carrier as described above and used as a two-component developer.

The image forming units 10Y, 10M, 10C, and 10Bk have the same configuration except that the colors of the toner images formed on the photoreceptors 1Y, 1M, 1C, and 1Bk are different, and the image forming unit 10Y will be described in detail as an example.

The image forming unit 10Y arranges a charging device 2Y, a latent image forming device 3Y, a developing device 4Y, and a cleaning device 6Y around the photoreceptor 1Y which is an image forming body, and a yellow (Y) toner image is formed on the photoreceptor 1Y. Further, in the present embodiment, at least the photoreceptor 1Y, the charging device 2Y, the developing device 4Y, and the cleaning device 6Y are provided so as to be integrated in the image forming unit 10Y.

The charging device 2Y is a device of providing a uniform electric potential to the photoreceptor 1Y. In the present invention, the charging device includes a device of a contact roller charging method.

The latent image forming device 3Y exposes the photoreceptor 1Y to which a uniform potential is applied by the charging device 2Y based on an image signal (yellow) to form an electrostatic latent image corresponding to a yellow image. As a latent image forming device 3Y, one composed of LEDs and imaging elements in which light emitting elements are arranged in an array in the axial direction of the photoreceptor 1Y, or a laser optical system is used.

The developing device 4Y contains, for example, a developing sleeve having a built-in magnet and rotating while holding a two-component developer, and a voltage applying device for applying a DC and/or AC bias voltage between the photoreceptor 1Y and the developing sleeve.

The cleaning device 6Y is composed of a cleaning blade provided so that the tip thereof abuts on the surface of the photoreceptor 1Y, and a brush roller provided on the upstream side of the cleaning blade and in contact with the surface of the photoreceptor 1Y. The cleaning blade has a function of removing residual toner adhering to the photoreceptor 1Y and a function of scraping the surface of the photoreceptor 1Y.

The brush roller has a function of scrubbing the surface of the photoreceptor 1Y, along with a function of removing residual toner adhering to the photoreceptor 1Y and collecting residual toner removed by the cleaning blade. That is, the brush roller comes into contact with the surface of the photoreceptor 1Y, and at the contact portion, the brush roller rotates in the same direction as that of the photoreceptor 1Y, and the residual toner and paper dust on the photoreceptor 1Y are removed, and the residual toner removed by the cleaning blade is conveyed and collected. As described above, by combining the electrostatic charge image developing toner of the present invention, it is possible to stably form a high-quality image capable of exerting antibacterial and antiviral effects on non-image areas.

In the image forming system using the image forming apparatus 100, the transfer device for transferring the toner image formed on the photoreceptor to the transfer material uses an intermediate transfer body and the toner is transferred onto the intermediate transfer body as described below. This is an embodiment in which the toner image is secondarily transferred onto a transfer material after the image is first transferred.

The toner images of each color formed by the image forming units 10Y, 10M, 10C, and 10Bk are sequentially transferred to a rotating endless belt-shaped intermediate transfer body 70 provided in the intermediate transfer body unit 7 by the aid of the primary transfer rollers 5Y, 5M, 5C, and 5Bk as a primary transfer devise to form a composite color image. The endless belt-shaped intermediate transfer body 70 is a semi-conductive endless belt-shaped second image carrier wound and rotatably supported by a plurality of rollers 71, 72, 73 and 74.

The color image synthesized on the endless belt-shaped intermediate transfer body 70 is then transferred to the transfer material P (image support carrying the fixed final image: e.g., plain paper and transparency sheet). Specifically, the transfer material P stored in the paper cassette 20 is fed by the feeding device 21, and through a plurality of intermediate rollers 22A, 22B, 22C, 22D, and resist roller 23, it is transported to the secondary transfer roller 5*b* as the secondary transfer device. Then, the color image is collectively transferred (secondary transfer) from the endless belt-shaped intermediate transfer body 70 onto the transfer material P by the secondary transfer roller 5*b*. The transfer material P onto which the color image has been transferred is fixed by the fixing device 24, and is held by the paper discharge roller 25 and placed in the paper discharge tray 26.

The fixing device 24 is, for example, a device of a thermal roller fixing method comprising a heating roller equipped with an internal heating source and a pressure roller provided in a pressurized state so that a fixing nip is formed on the heating roller.

On the other hand, after the color image is transferred to the transfer material P by the secondary transfer roller 5*b* as the secondary transfer means, the residual toner is removed from the endless belt-shaped intermediate transfer body 70 in which the transfer material P is subjected to curvature separation by the cleaning device 6*b*.

During the image forming process, the primary transfer roller 5Bk is in contact with the photoreceptor 1Bk at all times. The other primary transfer rollers 5Y, 5M, and 5C abut on the corresponding photoreceptors 1Y, 1M, and 1C only during color image formation. The secondary transfer roller 5*b* contacts the endless belt-shaped intermediate transfer body 70 only when the transfer material P passes through here and the secondary transfer is performed.

Further, in the image forming apparatus 100, the housing 8 including the image forming sections 10Y, 10M, 10C, and 10Bk and the intermediate transfer body unit 7 may be pulled out from the apparatus main body 100A via the support rails 82L and 82R.

Although the image forming system in a color laser printer has been described using the image forming apparatus 100 shown in FIG. 3, the image forming system of the present invention may be used in a monochrome laser printer, or it is equally applicable to copy machines. The exposure light source may also be a light source other than a laser, for example, an LED light source.

Although the embodiments of the present invention have been described above, the present invention is not limited to the above-mentioned aspects, and various modifications can be made.

6. Output Product

The output product of the present invention is an output product formed by using the electrostatic charge image developing toner, and is characterized by being formed by using the electrostatic charge image developing toner as described above. The output product formed by using the electrostatic charge image developing toner of the present invention is preferable from the viewpoint that antibacterial and antiviral effects may be suitably exhibited.

(Recording Media)

The recording medium used for forming the output product of the present invention is not particularly limited. Examples thereof include plain paper from thin to thick, coated printing paper such as fine, art or coated paper, water-soluble paper, commercially available Japanese paper and postcard paper, plastic film, cloth, leather, and various other types of paper. The color of the recording media is not limited.

EXAMPLES

Hereinafter, the present invention will be specifically described with reference to examples, but the present invention is not limited thereto. In the following examples, unless otherwise noted, the operations were performed at room temperature (25° C.). Unless otherwise noted, "%" and "part" mean "mass %" and "part by mass", respectively.

A. Preparation of Resin Fine Particle Dispersion Liquid (A.1) Preparation of Resin Fine Particle Dispersion Liquid [LX-1]

(A.1.1) First Stage Polymerization: Preparation of Latex

In a 5,000-mL separable flask equipped with a stirrer, a temperature sensor, a cooling tube, and a nitrogen inlet, a surfactant solution (aqueous medium) prepared by dissolving 7.08 g of an anionic surfactant (sodium dodecylbenzene sulfonate: SDS) in 2,760 g of ion-exchanged water was charged in advance, and the mixture was stirred at a stirring speed of 230 rpm under a nitrogen stream. The internal temperature was raised to 80° C.

On the other hand, next, a mixed solution composed of 115.1 g of styrene, 42.0 g of n-butyl acrylate, 10.9 g of methacrylic acid, 0.1 mass % of the phthalocyanine compound (F-13) as a photosensitizer with respect to these monomer components, and 72.0 g of the compound represented by Formula (W) as a mold release agent was heated to 80° C. and dissolved to prepare a first monomer solution.

$$C\{CH_2OCO(CH_2)_{20}CH_3\}_4 \qquad \text{Formula (W):}$$

The first monomer solution (80° C.) was mixed and dispersed in the surfactant solution (80° C.) by a mechanical disperser having a circulation path. A dispersion liquid of emulsified particles (oil droplets) having a uniform dispersion particle size was prepared. Next, an initiator solution prepared by dissolving 0.84 g of a polymerization initiator (potassium persulfate: KPS) in 200 g of ion-exchanged water was added to this dispersion liquid, and the system was heated and stirred at 80° C. for 3 hours. Then, polymerization (first stage polymerization) was carried out to prepare a latex.

(A.1.2) Second Stage Polymerization

Next, a solution prepared by dissolving 8.00 g of a polymerization initiator (potassium persulfate: KPS) and 10.0 g of 2-chloroethanol as a water-soluble chain transfer agent in 240 g of ion-exchanged water was added to this latex. After 15 minutes, a second monomer solution containing 383.6 g of styrene, 140.0 g of n-butyl acrylate and 36.4 g of methacrylic acid was added dropwise at 80° C. over a period of 126 minutes. After completion of dropping, polymerization (second stage polymerization) was carried out by heating and stirring for 60 minutes, and then the mixture was cooled to 40° C. to prepare a resin fine particle dispersion liquid [LX-1].

[Measurement and Observation of Absorption Spectrum]

Next, an appropriate amount of this resin fine particle dispersion liquid was collected. It was applied onto a PET film using a spin coater, dried, and the absorption spectrum of the obtained solid film sample was measured. As a result, a sharp absorption peak was observed at 665 nm. Furthermore, when the solution absorption spectrum of the solution obtained by dissolving this film sample in THF was measured, an absorption peak was observed at 665 nm, which was the same as that of the solid film sample. Thus, this confirms that the phthalocyanine compound (F-13) used as photosensitizer was present as a monomolecular state.

(A.2) Preparation of Resin Fine Particle Dispersion Liquids [LX-2] to [LX-17]

Resin fine particle dispersion liquids [LX-2] to [LX-17] were prepared in the same way as preparation of resin fine particle dispersion liquid [LX-1], except that the type and content of the sensitizer are changed as shown in Table III in the (First stage polymerization: Preparation of latex). The presence or absence of the monomolecular state was also confirmed by measuring and observing absorption spectra in the same manner as for the resin fine particle dispersion liquid [LX-1], and the results are shown in Table III.

TABLE III

| Example or Comparative Example | Toner | | Resin fine particle dispersion liquid | | | | Photosensitizer-loaded silica fine particles | | | | | Activity evaluation |
|---|---|---|---|---|---|---|---|---|---|---|---|---|
| | | | | Photosensitizer | | | Pigment | | | Photosensitizer | | |
| | NO. | Color | Type | No. | Content [mass %] | State | Type | No. | State | No. | State | |
| Example 1 | 1 | Clear | [LX-1] | F-13 | 0.100 | Monomolecular | — | — | — | — | — | AA |
| Example 2 | 2 | Clear | [LX-2] | F-13 | 0.005 | Monomolecular | — | — | — | — | — | BB |
| Example 3 | 3 | Clear | [LX-3] | F-13 | 1.000 | Monomolecular | — | — | — | — | — | CC |
| Example 4 | 4 | Clear | [LX-4] | E- 1 | 0.100 | Monomolecular | — | — | — | — | — | CC |
| Example 5 | 5 | Clear | [LX-5] | F- 7 | 0.100 | Monomolecular | — | — | — | — | — | AA |

TABLE III-continued

| Example or Comparative Example | Toner NO. | Toner Color | Resin fine particle dispersion liquid Type | Photosensitizer No. | Photosensitizer Content [mass %] | Photosensitizer State | Pigment Type | Pigment No. | Pigment State | Photosensitizer-loaded silica fine particles Photosensitizer No. | Photosensitizer-loaded silica fine particles Photosensitizer State | Activity evaluation |
|---|---|---|---|---|---|---|---|---|---|---|---|---|
| Example 6 | 6 | Clear | [LX-6] | F- 9 | 0.100 | Monomolecular | — | — | — | — | — | AA |
| Example 7 | 7 | Clear | [LX-7] | H- 5 | 0.100 | Monomolecular | — | — | — | — | — | BB |
| Example 8 | 8 | Clear | [LX-8] | F-21 | 0.100 | Monomolecular | — | — | — | — | — | BB |
| Example 9 | 9 | Clear | [LX-9] | H- 2 | 0.100 | Monomolecular | — | — | — | — | — | BB |
| Example 10 | 10 | Clear | [LX-10] | G- 6 | 0.100 | Monomolecular | — | — | — | — | — | BB |
| Example 11 | 11 | Cyan | [LX-11] | F-13 | 1.000 | Monomolecular | [1] | F-13 | Aggregate | — | — | AA |
| Example 12 | 12 | Black | [LX-12] | F-13 | 1.000 | Monomolecular | [3] | Carbon black | Aggregate | — | — | BB |
| Example 13 | 13 | Clear | [LX-13] | — | — | — | — | — | — | F-3 | Monomolecular | BB |
| Example 14 | 14 | Cyan | [LX-14] | — | — | — | [1] | F-13 | Aggregate | F-3 | Monomolecular | BB |
| Comparative Example 1 | 15 | Clear | [LX-15] | — | — | — | — | — | — | — | — | DD |
| Comparative Example 2 | 16 | Cyan | [LX-16] | — | — | — | [2] | F-9 | Aggregate | — | — | DD |
| Example 15 | 17 | Black | [Pulverized P] | F- 9 | 0.100 | Monomolecular | [3] | Carbon black | Aggregate | — | — | BB |
| Example 16 | 18 | Clear | [LX-17] | I- 2 | 0.100 | Monomolecular | — | — | — | — | — | CC |

B. Preparation of Colorant Dispersion Liquid (B.1) Preparation of Colorant Dispersion Liquid [1] (Cyan)

11.5 parts by mass of sodium n-dodecyl sulfate was dissolved with stirring into 160 parts by mass of ion-exchanged water. While continuing to stir, 10 parts by mass of phthalocyanine compound (F-13) as a pigment was gradually added, and then the mixture was subjected to dispersion processing using a mechanical disperser "CLEARMIX W Motion CLM-0.8" (manufactured by M-Technique Co., Ltd.). Thus, a colorant dispersion liquid [1] in which the colorant was dispersed was prepared.

[Measurement and Observation of Particle Size and Absorption Spectrum]

The particle size of the colorant particles in this colorant dispersion liquid [1] was 89 nm in volume-based median diameter. The absorption spectrum measured by applying this colorant dispersion liquid [1] to a PET film showed a broad absorption spectrum with an absorption maximum peak of 576 nm, and no clear peak was observed at 665 nm of the solution absorption. Therefore, from this, it was confirmed that the phthalocyanine compound (F-13) used as a pigment existed not in a monomolecular state but in an aggregated state. The volume-based median diameter of the colorant fine particles in the colorant dispersion solution was measured under the following conditions with a device "MICROTRAC UPA-150" (manufactured by Honeywell Corporation).

<Measurement Conditions>

Sample refractive index: 1.59

Sample specific gravity: 1.05 (spherical particle equivalent)

Solvent refractive index: 1.33

Solvent viscosity: 0.797 [mPa·s] at 30° C., 1.002 [mPa·s] at 20° C.

Zero point adjustment: Adjustment is made by filling the measuring cell with ion-exchanged water.

(B.2) Preparation of Colorant Dispersion Liquid [2] (Cyan)

A colorant dispersion liquid [2] (cyan) was prepared in the same way as preparation of (B.1) Colorant dispersion liquid [1] (cyan), except that the pigment was changed to a phthalocyanine compound (F-9).

[Measurement and Observation of Particle Size and Absorption Spectrum]

The particle size of the colorant particles in this colorant dispersion liquid [2] (cyan) was 89 nm in volume-based median diameter. The absorption spectrum measured by applying this colorant dispersion liquid [2] to a PET film showed a broad absorption spectrum with an absorption maximum peak of 576 nm, and no clear peak was observed at 665 nm of the solution absorption. Therefore, from this, it was confirmed that the phthalocyanine compound (F-9) used as a pigment existed not in a monomolecular state but in an aggregated state. The volume-based median diameter of the colorant fine particles in the colorant dispersion liquid was measured under the same measurement conditions as for the colorant dispersion liquid [1].

(B.3) Preparation of Colorant Dispersion Liquid [3] (Black)

A colorant dispersion liquid [3] (black) was prepared in the same way as preparation of (B.1) Colorant dispersion [1] (cyan), except that sodium n-dodecyl sulfate was changed to 9 parts by mass and the pigment was changed to 42 parts by mas of carbon black (REGAL 330R, manufactured by Cabot Corporation).

[Measurement and Observation of Particle Size and Absorption Spectrum]

The particle size of the colorant particles in this colorant dispersion liquid [3] (black) was 25 nm in volume-based median diameter. The absorption spectrum measured by applying this colorant dispersion liquid [3] to a PET film showed a broad absorption spectrum. It was confirmed that the carbon black existed not in a monomolecular state but in an aggregated state. The volume-based median diameter of the colorant fine particles in the colorant dispersion liquid was measured under the same measurement conditions as for the colorant dispersion liquid [1].

C. Preparation of Photosensitizer-Loaded Silica Fine Particles [Si-1]

5 g of silica fine particles ($SiO_2$, OX-50 manufactured by Japan AEROSIL Corporation, surface area 55 $m^2$, average particle size 21 nm), 0.05 g of phthalocyanine compound (F-3) and 200 mL of toluene were mixed and heated to reflux for 2 hours. The reaction solution was thermally filtered and further washed with hot toluene, followed by washing with methanol. The resulting solid was vacuum dried to produce photosensitizer-loaded silica fine particles [Si-1].

D. Preparation of Each Toner (D.1) Preparation of Clear Toner (D.1.1) Preparation of Toner 1

1,250 g of resin fine particle dispersion liquid [LX-1] and 2,000 g of ion-exchanged water were placed in a 5 L four necked flask equipped with a temperature sensor, a cooling tube, a nitrogen inlet, and a stirrer. Then, the mixture were stirred to prepare an association solution. After adjusting the internal temperature of the association solution to 30° C., 5 mol/L sodium hydroxide solution was added to adjust the pH to 10.0. Next, an aqueous solution of 52.6 g of magnesium chloride hexahydrate dissolved in 72 g of ion-exchanged water was added over a period of 10 minute at 30° C. with stirring. After allowing the system to stand for 3 minutes, the temperature was started to rise and the system was brought up to 90° C. over a period of 6 minutes (rate of temperature increase=10° C./minute). In this state, an average diameter of the aggregated particles was measured with a device "Coulter Multisizer TA-III" (manufactured by Beckman Coulter Corporation). When the volume-based median diameter reached 6.5 μm, an aqueous solution prepared by dissolving 115 g of sodium chloride in 700 g of ion-exchanged water was added to stop particle growth, and the mixture was further heated and stirred at a liquid temperature of 90° C.±2° C. for 6 hours to continue fusion. The temperature was then cooled to 30° C. at a rate of 6° C./min, then, hydrochloric acid was added to adjust the pH to 2.0, and stirring was stopped. The aggregate particles were solid-liquid separated, washed four times with 15 liters of ion-exchanged water, and then dried in warm air at 40° C. to produce clear toner particles [TP-1]. The powder made of the clear toner particles [TP-1] was added with 1 mass % of hydrophobic silica (number average primary particle size=12 nm, hydrophobicity=68) and 1 mass % of hydrophobic titanium dioxide (number average primary particle size=20 nm, hydrophobicity=63), and they were mixed using a "Henschel mixer" (Mitsui Miike Machinery Co., Ltd.). Toner 1 was then prepared by removing coarse particles using a sieve with a 45 μm mesh opening.

(D.1.2) Preparation of Toners 2 to 10

Toners 2 to 10 were prepared in the same manner as in the preparation of toner 1, except that the type of the resin fine particle dispersion was changed as shown in Table III.

(D.1.3) Preparation of Toner 13

A resin fine particle dispersion (LX-13) was prepared in the same manner as the resin fine particle dispersion (LX-1) except that the photosensitizer was removed. Other than that, toner particles [TP-13] were obtained in the same manner as in the preparation of the resin fine particle dispersion liquid (LX-1). The toner particles [TP-13] were added with 0.6 mass % of hydrophobic silica (number average primary particle size=12 nm, hydrophobicity=68), 0.8 mass % of hydrophobic titanium dioxide (number average primary particle size=2.0 nm, hydrophobicity=63), and 0.6 mass % of the above photosensitizer-loaded silica fine particles [Si-1], and they were mixed using a "Henschel mixer" (Mitsui Miike Machinery Co., Ltd.). Toner 13 was then prepared by removing coarse particles using a sieve with a 45 μm mesh opening.

(D.1.4) Preparation of Toner 15 (Comparative Example 1)

A resin fine particle dispersion (LX-15) was prepared in the same manner as the resin fine particle dispersion (LX-1) except that the photosensitizer was removed. Other than that, toner particles [TP-15] were obtained in the same manner as in the preparation of the resin fine particle dispersion liquid (LX-1). The powder made of the toner particles [TP-15] was added with 1 mass % of hydrophobic silica (number average primary particle size=12 nm, hydrophobicity=68) and 1 mass % of hydrophobic titanium dioxide (number average primary particle size=20 nm, hydrophobicity=63), and they were mixed using a "Henschel mixer" (Mitsui Miike Machinery Co., Ltd.). Toner 15 was then prepared by removing coarse particles using a sieve with a 45 μm mesh opening.

(D.1.5) Preparation of Toner 18

A resin fine particle dispersion (LX-17) was prepared in the same manner as the resin fine particle dispersion (LX-1) except that 1.1 mass % of phenanthrene compound (I-2) was used as the photosensitizer. Other than that, toner particles [TP-18] were obtained in the same manner as in the preparation of the resin fine particle dispersion liquid (LX-1). The powder made of the toner particles [TP-18] was added with 1 mass % of hydrophobic silica (number average primary particle size=12 nm, hydrophobicity=68) and 1 mass % of hydrophobic titanium dioxide (number average primary particle size=20 nm, hydrophobicity=63), and they were mixed using a "Henschel mixer" (Mitsui Miike Machinery Co., Ltd.). Toner 18 was then prepared by removing coarse particles using a sieve with a 45 μm mesh opening.

(D.2) Preparation of Cyan Toner (D.2.1) Preparation of Toner 11

Cyan toner particles [CP-11] were obtained in the same manner as the toner particles [TP-1] except that 165 g of the colorant dispersion liquid [1] was added to the association solution. The powder made of the cyan toner particles [CP-11] was added with 1 mass % of hydrophobic silica (number average primary particle size=12 nm, hydrophobicity=68) and 1 mass % of hydrophobic titanium dioxide (number average primary particle size=20 nm, hydrophobicity=63), and they were mixed by a "Henschel mixer" (Mitsui Miike Machinery Co., Ltd.). Toner 11 was then prepared by removing coarse particles using a sieve with a 45 μm mesh opening.

(D.2.2) Preparation of Toner 14

A resin fine particle dispersion (LX-14) was prepared in the same manner as the resin fine particle dispersion (LX-1) except that the photosensitizer was removed, and cyan toner particles [CP-14] were obtained in the same manner as the toner particles [TP-1] except that 165 g of the colorant dispersion liquid [1] was added to the association solution. The cyan toner particles [CP-14] were added with 0.6 mass % of hydrophobic silica (number average primary particle size=12, hydrophobicity=68), 0.8 mass % of hydrophobic titanium dioxide (number average primary particle size=2.0 nm, hydrophobicity=63), and 0.8 mass % of the above photosensitizer-loaded silica fine particles [Si-1], and they were mixed using a "Henschel mixer" (Mitsui Miike Kakoki Co., Ltd.). Toner 14 was then prepared by removing coarse particles using a sieve with a 45 μm mesh opening.

(D.2.3) Preparation of Toner 16 (Comparative Example 2)

Cyan toner particles [CP-16] were obtained in the same manner as the toner particles [TP-1] except that 165 g of the colorant dispersion liquid [2] was added to the association solution. The cyan toner particles [CP-16] were added with 0.6 mass % of hydrophobic silica (number average primary particle size=12, hydrophobicity=68), 0.8 mass % of hydrophobic titanium dioxide (number average primary particle size=2.0 nm, hydrophobicity=63), and 0.8 mass % of the above photosensitizer-loaded silica fine particles [Si-1], and they were mixed using a "Henschel mixer" (Mitsui Miike Machinery Co., Ltd.). Toner 16 was then prepared by removing coarse particles using a sieve with a 45 μm mesh opening.

(D.3) Preparation of Black Toner (D.3.1) Preparation of Toner 12

Black toner particles [BP-12] were obtained in the same manner as the toner particles [TP-1] except that 165 g of the colorant dispersion liquid [3] was added to the association solution. The powder made of the black toner particles [BP-12] was added with 1 mass % of hydrophobic silica (number average primary particle size=12 nm, hydrophobicity=68) and 1 mass % of hydrophobic titanium dioxide (number average primary particle size=20 nm, hydrophobicity=63), and they were mixed by a "Henschel mixer" (Mitsui Miike Machinery Co., Ltd.). Toner 12 was then prepared by removing coarse particles using a sieve with a 45 μm mesh opening.

(D.3.2) Preparation of Toner 17

100 parts by mass of polyester resin (weight average molecular weight (Mw) 20,000), which is a condensate of bisphenol A-ethylene oxide adduct, terephthalic acid, and trimellitic acid, and 0.1 parts by mass of phthalocyanine compound (F-9) were heated and dissolved in toluene. After complete dissolution, the toluene was removed to prepare a polyester resin [Pulverized P] containing the photosensitizer in a monomolecular state. The resulting photosensitizer-containing polyester resin, 4 parts by mass of carbon black, 6 parts by mass of pentaerythritol tetrastearate as a mold release agent, and 1 part by mass of boron dibenzylate as a charge control agent were combined. They were fed into a "Henschel mixer" (manufactured by Mitsui Miike Machinery Co., Ltd.) and mixed for 5 minutes with the peripheral speed of the agitator blades set at 25 m/sec.

The mixture was then kneaded in a twin-screw extruder, coarsely ground in a hammer mill, milled in a Turbo Mill (Turbo Industries, Inc.), and finely classified in an airflow classifier that uses the Coanda effect. Thus, black toner particles [BP-17] having a volume-based median diameter of 5.5 μm were obtained.

The powder made of the black toner particles [BP-17] were then added with 0.6 mass % of hexamethylsilazane-treated silica (number average primary particle size: 12 nm), and 0.8 mass % of n-octylsilane treated titanium dioxide (number average primary particle size: 24 nm). By using a "Henschel mixer" (manufactured by Mitsui Miike Machinery Co., Ltd.) to add an external additive under the conditions of a peripheral speed of the stirring blade of 35 m/sec, a treatment temperature of 35° C., and a treatment time of 15 minutes, toner 17, which is a pulverized black toner, was produced.

E. Preparation of Developer

A ferrite carrier having a volume-based median diameter of 60 μm coated with a silicone resin was mixed with each of the prepared toners so that the concentration of each toner was 6 mass % to prepare a two-component developer.

F. Method of Making an Electrophotographic Image (Evaluation Sample) and Observing Phosphorescence Each of the manufactured toners was set in a full-color high-speed multifunction device "bizhub C6500" (manufactured by Konica Minolta, Inc.). Under the conditions set to a fixing line speed of 310 mm/min (about 65 sheets/minute), a patch image was printed on "POD gloss coated paper 128 $g/m^2$" (manufactured by Oji Paper Co., Ltd.) with a toner adhesion amount of 4 $g/m^2$.

A sample was cut out from the above image, and an attempt was made to detect the phosphorescence spectrum derived from singlet oxygen when the sample was irradiated with light using a spectrofluorometer EP-8700 (manufactured by JASCO Corporation). In the examples in Table III, phosphorescence derived from singlet oxygen could be observed near 1,270 nm, but in the comparative examples, phosphorescence could not be observed. The measurement was performed under the following measurement conditions.

(Measurement Conditions)

Measurement system: EP-8700 (manufactured by JASCO Corporation)

Measurement mode: Fluorescence (monochromatic light monitor ratio calculation method)

Excitation wavelength range: Excitation is performed by irradiating monochromatic light with a wavelength (in the range of 350 to 800 nm) corresponding to the absorption maximum wavelength of a photosensitizer having the ability to generate singlet oxygen in a monomolecular state or in an aggregated state.

Measurement interval: 5 nm

Measurement wavelength range: 1,200 to 1,350 nm

Data acquisition interval: 2 nm

The absorption maximum wavelength of the photosensitizer was measured by measuring the spectral absorption spectrum of the solution dissolved in tetrahydrofuran (THF).

G. Confirmation of Coloration Derived from Monomolecular Absorption Spectrum of Photosensitizer: Evaluation of Indicator Property of Singlet Oxygen Generating Ability As mentioned above, toner 1 is a clear toner containing phthalocyanine dye in a monomolecular state, it has a blue color, and it may effectively produce singlet oxygen in this state.

A xenon lamp was used for this toner 1, and light irradiation was performed for 8 hours under the condition of 1 SUN (100 $mW/cm^2$). Then, the toner 1 was irradiated with monochromatic light of 665 nm. A phosphorescent peak derived from singlet oxygen could be observed near 1,270 nm with a fluorometer, and the same blue color as before light irradiation could be visually recognized.

In contrast, the toner 1 was irradiated with a xenon lamp under the condition of 1 SUN (100 $mW/cm^2$) for 30 days. When irradiated with monochromatic light of 665 nm, no blue color was visible. The absorption peak of the phthalocyanine dye when irradiated with monochromatic light of 665 nm also disappeared.

From the above, it can be said that the coloration derived from the monomolecular absorption spectrum of photosensitizers may be used as an indicator of a singlet oxygen generating ability.

H. Antibacterial and Antiviral Effects (H.1) Confirmation of Antibacterial Effect The antibacterial effect was confirmed using JIS Z 2801: 2010 (Antibacterial processed products—Antibacterial test method/antibacterial effect). A 5 cm square sample was cut from the patch portion of the printed image produced using the toner in each example and used as the sample for the antibacterial test. The samples were used to evaluate the number of viable *Escherichia coli* after 24 hours at 35° C. by the film adhesion method.

*Escherichia coli* (ISO 3301) was used as the test bacterium. In order to prepare the test bacterial solution, first, a normal bouillon solution was prepared by dissolving 5 g of meat extract, 10 g of peptone, and 5 g of sodium chloride in 1 L of distilled water. This bouillon solution was further diluted 500 times with distilled water, and *Escherichia coli* was suspended in such a solution, and the number of bacteria per 1 mL was adjusted to $1.0\times10^6$. After dropping 0.5 mL of the bacterial solution onto this sample, a polyethylene film was brought into close contact with the sample and left at 35° C. for 24 hours.

The bacteria adhering to this sample and the coating film were flushed into a sterile petri dish using 9.5 mL of SCDLP medium (manufactured by Nihon Pharmaceutical Co., Ltd.). The viable cell count in 1 mL of this washout solution was measured by the agar plate dilution method using a standard agar medium for measuring the bacterial count (manufactured by Nissui Co., Ltd.), and the sterility rate was calculated to be 99.98%, which showed excellent antibacterial properties.

The above antibacterial effect was confirmed to have good antibacterial activity under the standard that the antibacterial activity is good when the number of bacteria added for the first time is reduced to less than one-thousandth of the number of bacteria in the above sample as defined by the film adhesion method.

(H.2) Activity Evaluation of Each Toner Image (Evaluation Method)

Since (H.1) above showed that each toner of the present invention had good antibacterial properties, the antibacterial effect of each toner in the examples and comparative examples were compared by comparing the magnitude of the dye fading effect due to singlet oxygen by the following method, which was used as a substitute evaluation.

The image samples were cut into 5 cm squares and placed in a transparent petri dish, and then soaked with 0.1% rubrene-alcohol solution. Filter paper (5 mm×5 mm) was placed on top and sealed to make each sample for the examples and comparative examples.

Each of the above samples was left under 1000 (1×) fluorescent light for 24 hours at room temperature. The filter paper was removed from the petri dish, the dye concentration was measured, and the percentage remaining was determined from the ratio to the initial concentration. The evaluation criteria are listed below. The results of each evaluation are also shown in Table III.

(Evaluation Criteria)

AA: Residual rate is less than 10%.

BB: Residual rate is 10% or more and less than 30%.

CC: Residual rate is 30% or more and less than 90%.

DD: Residual rate is 90% or more.

The results in Table III suggest that the toner of the present invention can convert oxygen in the air into an active species (singlet oxygen) even under weak light irradiation such as room light irradiation. Based on the results of the above evaluation experiments (H.1) and (H.2), it is inferred that singlet oxygen also has an oxidative effect against viruses, that is, has an antiviral property.

(H.3) Antiviral Effect

Regarding the antiviral effect of singlet oxygen, the aqueous varnish using the same photosensitizer as the phenalene derivative used in the examples of the present invention: Lock3 (manufactured by Varcotec Corporation) has an antiviral effect. This is supported by the fact that it has been demonstrated in ISO 21702 (antiviral) compliant tests.

Although embodiments of the present invention have been described and illustrated in detail, the disclosed embodiments are made for purposes of illustration and example only and not limitation. The scope of the present invention should be interpreted by terms of the appended claims.

DESCRIPTION OF SYMBOLS

100: Image forming apparatus
1A, 1B, 1Y, 1M, 1 C, 1Bk: Photoreceptor
2Y, 2M, 2C, 2Bk: Charging device
3Y, 3M, 3C, 3Bk: Exposure device
4Y, 4M, 4C, 4Bk: Developing device
5Y, 5M, 5C, 5Bk: Primary transfer roller
5*b*: Secondary transfer roller
6Y, 6M, 6C, 6Bk, 6*b*: Cleaning device
7: Intermediate transfer body unit
8: Housing
10Y, 10M, 10C, 10Bk: Image forming unit
21: Paper feeding device
20: Paper cassette
22A, 22B, 22C, 22 22D: Intermediate roller
23: Resist roller
24: Fixing device
25: Paper discharge roller
26: Paper discharge tray
70: Endless belt-shaped intermediate transfer body
71, 72, 73, 74: Roller
82L, 82R: Support rail
P: Transfer material

What is claimed is:

1. An electrostatic charge image developing toner comprising toner matrix particles containing at least a binder resin, wherein a photosensitizer having a singlet oxygen generating ability is contained inside the toner matrix particles or in an external additive attached to the toner matrix particles, and the toner matrix particles contain metal oxide particles loaded with the photosensitizer.

2. The electrostatic charge image developing toner according to claim 1, wherein the photosensitizer is dispersed in the binder resin in a monomolecular state.

3. The electrostatic charge image developing toner according to claim 1, wherein in an emission spectrum measurement of the photosensitizer, when irradiated with monochromatic light corresponding to an absorption maximum wavelength of the absorption spectrum of the solution of the photosensitizer, phosphorescence with a maximum emission wavelength attributed to singlet oxygen is observed in the range of 1,270±20 nm.

4. The electrostatic charge image developing toner according to claim 1, exhibiting a coloration derived from a monomolecular absorption spectrum of the photosensitizer as an indicator of the singlet oxygen generating ability.

5. The electrostatic charge image developing toner according to claim 1, wherein the photosensitizer is a phthalocyanine dye or an analog thereof.

6. The electrostatic charge image developing toner according to claim 1, wherein the photosensitizer has a structure represented by Formula (1), Formula (1)

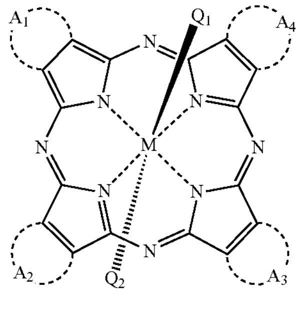

in Formula (1), M represents a metal atom of Group 14, $Q_1$ and $Q_2$ each independently represent a monovalent axial ligand, provided that Formula (1) may not have either one of $Q_1$ and $Q_2$, and $A_1$ to $A_4$ each independently represent a group of atoms that forms an aromatic ring that may have a substituent.

7. The electrostatic charge image developing toner according to claim 1, wherein the metal oxide particles contain a compound having a structure represented by Formula (2) or a reactant of the compound represented by Formula (2) formed by reacting with an atom or a functional group contained in the metal oxide particles to form a bond, $$PS\text{—}(OH)_n \qquad \text{Formula (2):}$$

wherein PS represents a photosensitizer having singlet oxygen generating ability, and n is an integer.

8. The electrostatic charge image developing toner according to claim 7, wherein PS in Formula (2) represents a phthalocyanine dye or an analog thereof.

9. A method for producing the electrostatic charge image developing toner according to claim 1, comprising the step of preparing the toner matrix particles containing the metal oxide particles loaded with the photosensitizer.

10. An image forming method comprising:

developing a latent image by a color toner to form a developed image; and forming a dot using the electrostatic charge image developing toner according to claim 1, wherein the dot is formed outside an area of the developed image.

11. The image forming method according to claim 10, wherein the dot has a diameter of 60 μm or less.

12. An image forming system having a photoreceptor charging device, a latent image forming device, a developing device, a transfer device, and a cleaning device, using the electrostatic charge image developing toner according to claim 1.

13. An output product formed with the electrostatic charge image developing toner according to claim 1.

* * * * *